US012201105B1

(12) United States Patent
Files et al.

(10) Patent No.: US 12,201,105 B1
(45) Date of Patent: *Jan. 21, 2025

(54) USING ARTIFICIAL INTELLIGENCE (AI) TO DETECT PEST ACTIVITY WITHIN A WALL OF A BUILDING

(71) Applicant: Katcher LLC, Round Rock, TX (US)

(72) Inventors: Jace W. Files, Round Rock, TX (US); Roger S. Hollander, Austin, TX (US); John Trevor Morrison, Round Rock, TX (US); Shivshanker S. Naimpally, Leander, TX (US)

(73) Assignee: Katcher LLC, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/896,731

(22) Filed: Sep. 25, 2024

Related U.S. Application Data

(63) Continuation of application No. 18/750,212, filed on Jun. 21, 2024.

(60) Provisional application No. 63/549,872, filed on Feb. 5, 2024.

(51) Int. Cl.
*A01M 1/02* (2006.01)
*G01D 21/02* (2006.01)

(52) U.S. Cl.
CPC ............. *A01M 1/026* (2013.01); *G01D 21/02* (2013.01)

(58) Field of Classification Search
CPC ............................... A01M 1/026; G01D 21/02
USPC ......................................................... 340/573.2
See application file for complete search history.

(56) References Cited

U.S. PATENT DOCUMENTS

| 11,877,571 B1* | 1/2024 | Alhuwaidi | ............ A01M 1/023 |
| 12,022,820 B1* | 7/2024 | Zhang | ..................... A01M 1/04 |
| 2020/0236920 A1* | 7/2020 | Fages | ..................... A01M 1/14 |

\* cited by examiner

*Primary Examiner* — Omar Casillashernandez
(74) *Attorney, Agent, or Firm* — Shiv S. Naimpally

(57) ABSTRACT

In some examples, a central hub receives, from a sensor node that is mounted to a wood item inside a wall of a building, a notification including sensor data. The sensor data includes: an ambient temperature inside the wall of the building, an ambient humidity inside the wall of the building, a resistance of the wood item between two metal fasteners used to fasten the sensor node to the wood item, and audio data captured by a microphone of the sensor node that is coupled to the wood item. The hub performs an analysis of the sensor data using an artificial intelligence algorithm. After determining, based on the analysis, a presence of a pest in the wood item, the hub sends a message indicating the presence of the pest to a computing device.

20 Claims, 15 Drawing Sheets

USING ARTIFICIAL INTELLIGENCE (AI) TO DETECT PEST ACTIVITY WITHIN A WALL OF A BUILDING

PRIORITY DATA

The present non-provisional patent application claims priority to and the benefit from U.S. Provisional Application 63/549,872 filed on Feb. 5, 2024 and from U.S. patent application Ser. No. 18/750,212 filed on Jun. 21, 2024 which are incorporated herein by reference in their entirety and for all purposes as if completely and fully set forth herein.

BACKGROUND OF THE INVENTION

Field of the Invention

The invention relates to detecting conditions conducive to pest activity.

Description of the Related Art

Wood-boring pests, such as, for example, carpenter ants, termites, beetles (e.g., ark beetles, wood borers, powderpost beetles, and other wood-boring beetles), carpenter bees, wood wasps, and the like are a major issue for wooden containing items. For example, wood boring pests may cause damage to buildings (e.g., single family homes, multifamily homes, townhouses, commercial buildings, and the like) that use wood in their construction, resulting in billions of dollars in damage each year. Further, many valuable wooden items, such as telephone poles, railway ties, aging barrels (e.g., used to age food or drinks such as alcohol, vinegar, cheese, and so on), antiques, and other wooden items may be the target of wood-boring pests. Current solutions involve periodic application of a chemical treatment to repel and/or kill wood-boring pests. Such chemical treatments may pose a hazard to humans as well as animals (e.g., pets). Because wood-boring pests operate within the walls of the building, such pest activity may go undetected for month or even years. Currently, conditions (e.g., temperature, humidity conditions, and wood moisture content) that are conducive to pest activity, such as wood-boring pests, within walls are difficult to detect without creating an opening in a wall and looking within the walls. In addition, wood-boring pests may destroy wooden fences, trees and shrubs in a yard, such as a front yard, a back yard, a park, or another type of outdoor area.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a central hub receives, from a sensor node that is mounted to a wood item inside a wall of a building, a notification including sensor data. The sensor data includes: an ambient temperature inside the wall of the building, an ambient humidity inside the wall of the building, a resistance of the wood item between two metal fasteners used to fasten the sensor node to the wood item, and audio data captured by a microphone of the sensor node that is coupled to the wood item. The hub performs an analysis of the sensor data using an artificial intelligence algorithm. After determining, based on the analysis, a presence of a pest in the wood item, the hub sends a message indicating the presence of the pest to a computing device.

DETAILED DESCRIPTION

Figure 1:
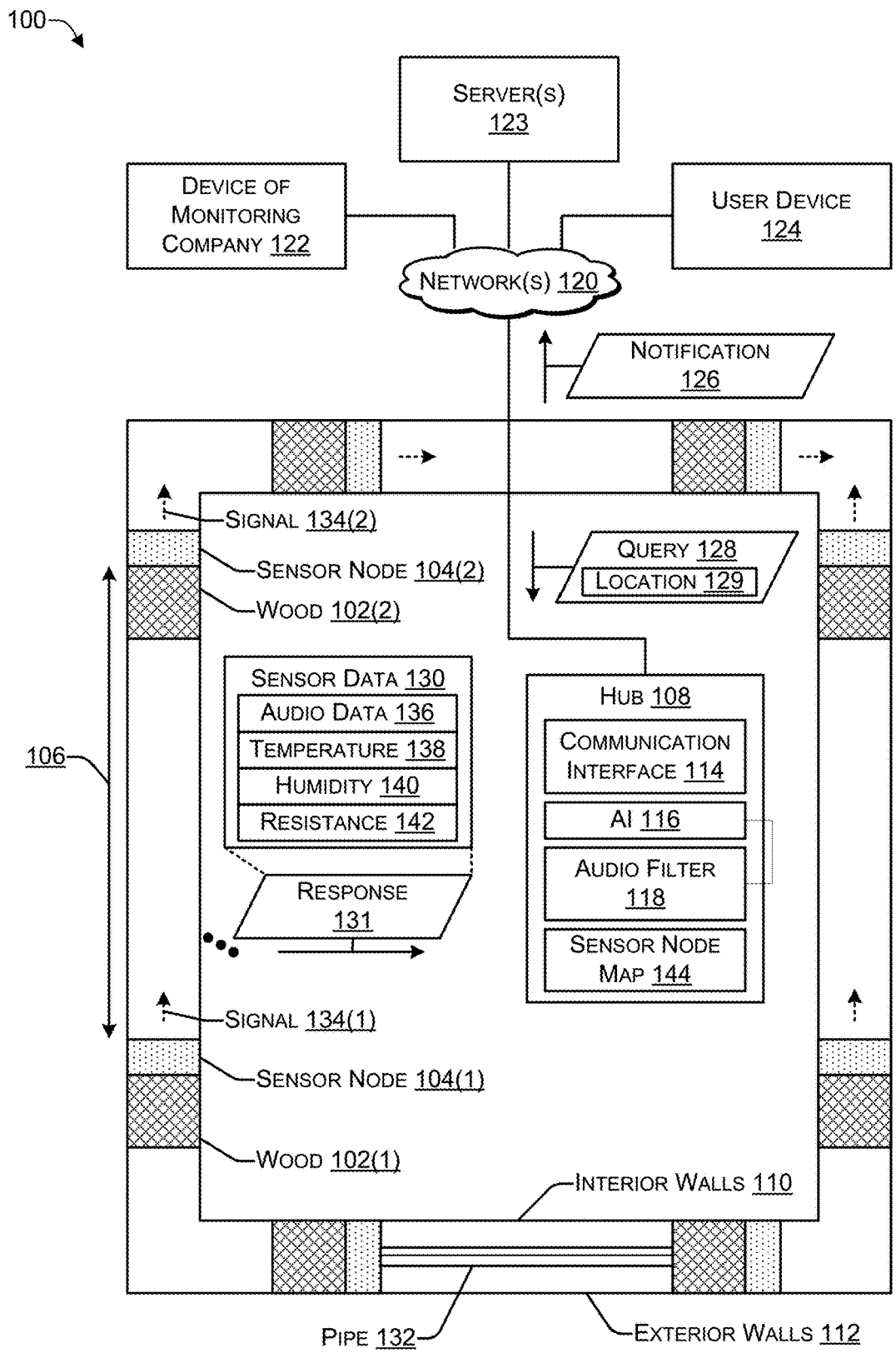
FIG. 1 is a block diagram illustrating a building that includes multiple sensor nodes deployed within the walls of a building, according to some embodiments.

The systems and techniques described herein include sensor nodes that can be attached to wood that may be the target of wood-boring pests, such as, for example, carpenter ants, termites, beetles (e.g., ark beetles, wood borers, powderpost beetles, and other wood-boring beetles), carpenter bees, wood wasps, woodpeckers, and the like. The sensor nodes may be attached to wood studs of a building, wooden stakes in a yard, telephone poles, railway ties, aging barrels (e.g., used to age food and beverages, such as alcohol, vinegar, cheese, and the like), and other wood-based items that may attract wood-boring pests. The systems and techniques include a central hub that receives data collected by multiple sensor nodes and uses Artificial Intelligence (AI) to determine if the data indicates (1) conditions that are conducive to pest activity (based on a temperature and humidity within the walls and wood moisture content) and (2) pest activity (e.g., wood-boring pests, rats, mice, cockroaches, and other pests). The AI may be trained to collect audio and vibration data to detect time domain and/or frequency domain signatures of various pest activity. The AI may be trained to use the data received from multiple sensor nodes to detect leaks in pipes within walls. The AI may be trained to detect underground activities, such as excavation, tunneling, and the like that may be used to create underground tunnels to aid in unlawful activities, such as smuggling and enabling goods and/or humans to move from one area to another area.

The systems and techniques described herein include a monitoring system that includes multiple sensor nodes may be deployed during construction of a building (e.g., single family home, multifamily home, townhome, condominium, commercial building, or the like) to detect pest activity, such as termites, mice, rats, or the like. For example, a sensor node may be attached to individual wood beams (e.g., studs), with a particular sensor node mounted no more than a predetermined distance (e.g., 10 to 30 meters (m)) from other sensor nodes deployed in the same building. To conserve the battery used to power each sensor node, a sensor node periodically (at a predetermined time interval) wakes up from a dormant mode, measures an ambient temperature within walls of the building using a thermometer, measures an ambient humidity within the walls using a humidity sensor (hygrometer), measures a resistance of the wood beam (indicating an amount of moisture present in the wood beam) to which the sensor node is attached using an ohmmeter, and then transitions back to the dormant mode. In some cases, the predetermined interval may change based on the conditions detected. For example, if one or more of the conditions changes to a level where an issue (leak, pest activity, or the like) may be likely, then the predetermined interval may be shortened, causing the sensor node to wake up and take measurements more frequently. If the temperature level satisfies a temperature threshold and the humidity level satisfies a humidity threshold, then the sensor node determines that the temperature and humidity are conducive for a particular type of pest, such as termites, and uses a microphone to capture audio data. In some cases, additional sensors may include accelerometers, vibration sensors, tilt sensors, and the like to collect additional audio data, vibration data, to determine a shift in position (e.g., change in a 3-dimensional position to detect a leaning telephone pole). In some cases, the sensor node may detect moisture levels, PH (e.g., acidity/alkalinity) levels (e.g., outside, such as in soil). In some cases, the sensor node may use one or more sensors to collect audio data and/or vibration data associated with bridges, railway ties, and the like. The sensor node performs an analysis of the audio data to determine whether the audio data indicates pest activity, such as the noise made by termites when consuming wood. If the sensor node's analysis indicates that pests may be present, then the sensor node sends a notification to a central hub. The central hub is located inside the building and monitors the multiple sensor nodes deployed within the walls of the building. The central hub may relay the notification to a computing device (e.g., smartphone) associated with an occupant of the building (e.g., homeowner, building manager, or the like), a computing device associated with a monitoring company (e.g., pest control company, utility company with a wood-based transmission tower), or both. The occupant or a representative of the monitoring company may, in response to the notification, perform additional investigation and take actions to address the termites and any damage caused.

The sensor nodes may be configured to detect leaks in pipes (e.g., cold water, hot water, and wastewater) that run within the walls of the building. For example, when the sensor node wakes up from the dormant mode at the predetermined time interval and the wood resistance sensor (e.g., ohmmeter) measures the resistance of the wood (to determine a moisture level of the wood), the sensor node may compare a current resistance with a previously captured (and stored) resistance. If the difference between the current resistance and the previous resistance satisfies a predetermined resistance threshold or the rate of change of the resistance changes over a certain time period, indicating increased moisture in the wood, then the sensor node may send a notification to the central hub which may send the notification to the occupant's device or to the device of a representative of a monitoring company. The occupant or the representative of the monitoring company may, in response to the notification, perform additional investigation and take actions to address the leak and any damage caused.

The two screws (or other types of metal fasteners) used to attach the sensor node to the wood beam may be used by the sensor node (e.g., using an ohmmeter) to determine a resistance of the wood between the two screws. The sensor node uses the wood resistance to determine (calculate) a wood moisture level. In addition, a small opening ("port") in the housing of the sensor node enables the temperature sensor to determine an ambient temperature (of the air) within the walls of the building and enables the humidity sensor (hygrometer) to determine an ambient humidity (of the air) within the walls of the building. For example, a water leak may result in high wood moisture but low ambient humidity. A weighted combination of the ambient temperature, the ambient humidity, and the wood moisture level may be used to determine whether the conditions are conducive to pest activity, such as termites, carpenter ants, or the like. If the conditions are conducive to pest activity, then the sensor node may use the microphone (audio sensor) to capture audio data transmitted by the wood beam and/or change the rate at which audio samples are captured (e.g., sample more frequently if conditions are conducive and sample less frequently if conditions are not conducive to pest activity). The sensor node may filter the audio data to determine whether the filtered audio data indicates pest activity. For example, termite activity can be detected in the ultrasonic frequency range, between about 20 kilohertz (kHz) to about 40 KHz. By filtering the captured audio data to exclude other frequencies, the frequency band between 20-40 KHz can be analyzed to determine if termite activity is present. In some cases, the sensor node may detect the audio signatures of pest activity in the lower, audible range (e.g., 1 kHz-20 kHz), though this audio range may be somewhat noisier than the ultrasonic range. The sensor node may use a sample rate of 192 KHz, 96 KHz, 48 kHz, which give, per their Nyquist frequency, valid sample data up to 96 kHz, 48 KHz, 24 kHz, respectively. Of course, these are merely examples, and other sampling rates may be used in keeping with the systems and techniques described herein. The Nyquist frequency is a characteristic of a sampler that converts a continuous signal (analog) into a discrete sequence (digital samples). For a given sampling rate (samples per second), the Nyquist frequency (cycles per second) is the frequency whose cycle-length (e.g., period) is twice the interval between samples, thus 0.5 cycle/sample.

The systems and techniques described herein have multiple applications. First, the systems and techniques may be used to provide in wall monitoring and alerting for termites and other wood boring pests and for leak detection. Second, the systems and techniques may be used to provide outdoor area monitoring and alerting for wood boring pests and other pests, such as fire ants, grubs and the like and to provide remote monitoring of soil conditions, include moisture levels, PH levels (e.g., acidity/alkalinity), and other conditions. Third, the systems and techniques may be used to monitor poles, including fence posts, utility poles (e.g., telephone poles, electrical poles, and the like), including determining if the conditions are conducive to pest activity, detecting pest activity (e.g., termites, woodpeckers, or the like), measuring and alerting on integrity (e.g., pole is leaning and no longer perpendicular to the ground), and the like. Fourth, the systems and techniques may be used to monitor wood-based bridges and railroad ties, including determining if the conditions are conducive to pest activity, detecting pest activity (e.g., termites, woodpeckers, or the like), and the like. Fifth, the systems and techniques may be used to provide monitoring and alerting for underground activities, including creating an unauthorized tunnel (e.g., between countries, to escape from a secure facility, such as a prison, or the like), using the tunnel for unauthorized activities (e.g., smuggling humans, illegal goods such as drugs, guns, explosives or the like). Such monitoring may be performed near the borders between two (or more) countries, secure facilities, such as prisons or government buildings (e.g., detect someone attempting to tunnel and place explosives below a government building), and the like.

The systems and techniques herein describe a monitoring system that includes multiple sensor nodes attached to wood-based items (e.g., wood beams, telephone poles, railway tics, aging barrels, or another type of wooden structure). For example, multiple sensor nodes may be attached to wooden beams during construction of a building to detect pest activity, such as activity caused by wood-boring pests (e.g., carpenter ants, termites, ark beetles, wood borers, powderpost beetles, and other wood-boring beetles, carpenter bees, wood wasps, woodpeckers, mice, rats, or the like) as well as other pests, such as rats, mice, cockroaches, and the like. The types of buildings include single family homes, multifamily homes, townhomes, condominiums, commercial buildings, or the like. In some cases, individual sensor nodes may be attached to a wood-based item, such as, for example, a telephone pole, a railway tic, an aging barrel, or another type of wood-based item. An aging barrel is a wooden barrel used to store liquids (e.g., vinegar, alcohol, or the like), solids (e.g., cheese), or another type of consumable product for the purpose of aging the contents. For a building, individual sensor nodes may be attached to individual wood beams (e.g., studs), with a particular sensor node mounted no more than a predetermined distance (e.g., 10 to 30 meters) from other sensor nodes deployed in the same building to enable the sensor nodes to relay (e.g., via a daisy chain) messages to and from a central hub. The wood beams may include any type of wood-based component (e.g., building studs, fence posts, utility poles, railway tics, aging barrels, or the like) that wood-boring pests may target. For example, the wood components of a building may be located within the walls of the building where pest damage may not be readily visible to occupants of the building. As another example, wooden utility poles may be located in relatively unpopulated or rural areas where the poles are not monitored on a daily or even weekly basis and where damage caused by wood boring pests may go undetected for a significant length of time. As a further example, wooden railway ties may be located in relatively unpopulated or rural areas where the ties are not monitored on a daily or even weekly basis and where damage caused by wood boring pests may go undetected for a significant length of time.

Each sensor node may be powered by a power source, such as, for example, a battery (rechargeable or non-rechargeable), one or more solar panels, by accessing a power grid (e.g., 110 volts, 220 volts, or the like), or the like. To conserve the power of the battery used to power each sensor node, each sensor node may periodically, at a predetermined time interval, transition from a dormant mode to a wake mode, measure an ambient temperature using a thermometer, measure an ambient humidity level using a humidity sensor (hygrometer), measure a wood resistance (to determine a wood moisture level) using an ohmmeter, or any combination thereof. If the temperature level satisfies a temperature threshold and the humidity level satisfies a humidity threshold, then the sensor node may determine that the temperature and humidity are conducive for a particular type of pest, such as wood-boring pests, and may use a microphone to capture audio data (including ultrasonic frequencies) of pest activity transmitted via the wood item to which the sensor node is attached. The sensor node performs an analysis of the audio data to determine whether the audio data indicates activity, such as, for example, the noise made by wood-boring pests when consuming wood. If the sensor node's analysis of the audio data indicates that word-boring pests may be present, then the sensor node sends a notification to a central hub. In some cases, a particular type of sensor node used on wooden poles (e.g., fence post or utility poles, such as telephone poles, electricity poles, and/or other types of utility poles) may include a tilt sensor (a type of transducer) to provide information about the horizontal inclination an/or vertical inclination of the wooden pole to which the sensor node is attached. A tilt sensor produces an electrical signal that varies with angular movement and may be used to measure slope and tilt.

Each central hub may monitor multiple sensor nodes. For example, in a building, one or more central hubs may individually monitor multiple sensor nodes deployed within the walls of the building. For telephone pole, railway ties, aging barrels, and the like, one central hub may be used for X (X>0) sensor nodes or Y (Y>0) distance. For example, one central hub may be deployed for every X=5, 10, 15, 20, etc. sensor nodes, every Y=100, 200, 300, etc. yards, or similar. After the central hub receives a notification from a sensor node, the central hub may send the notification to a computing device (e.g., smartphone) associated with an occupant of the building (e.g., homeowner, building manager, or the like), a computing device associated with a monitoring company (e.g., pest control company), or both. The occupant or a representative of the monitoring company may, in response to the notification, perform an additional investigation and/or take actions to address the wood-boring pests and any damage caused. An individual sensor node may capture audio data that include vibrations in the wood beam to which the sensor node is attached. In some cases, the sensor node may use artificial intelligence (AI) to determine the cause of the vibrations. In other cases, the sensor node may send at least a portion of the audio data to the central hub and the central hub may analyze the audio data 136 using AI to determine the cause of the vibrations. The AI algorithms may use spectrograms to represent the audio and/or vibration data. A spectrogram, which represents the spectrum of an audio signal over time contains time domain data and frequency domain data in a single dataset. This dataset may be input into a deep learning model, such as, a convolutional neural network (CNN) architecture or similar, to extract and determine pest activity. This dataset may be used to quantify and identify specific species of wood boring pests such as, for example, a specific species of termites or a specific species of carpenter ants. By identifying the specific species of wood boring pest along with the ambient temperature, ambient humidity, and wood resistance (wood moisture level), the AI (e.g., CNN) may be used to determine (predict) a risk of damage. Deep learning is a subset of machine learning techniques based on neural networks with representation learning. The adjective "deep" refers to the use of multiple layers in the network. The techniques used may include supervised, semi-supervised or unsupervised learning. Deep learning systems include a substantial credit assignment path (CAP) depth. The CAP is the chain of transformations from input to output. CAPs describe potentially causal connections between input and output. For a feedforward neural network, the depth of the CAPs is that of the network and is the number of hidden layers plus one (as the output layer is also parameterized). For recurrent neural networks, in which a signal may propagate through a layer more than once, the CAP depth is greater than or equal to two. Deep models (CAP>2) are able to extract better features than shallow models and hence, extra layers help in learning the features effectively. Deep learning architectures may include a greedy layer-by-layer method. The sensor nodes and/or hubs may include software-based AI, hardware-based AI or a combination of both. For example, special electronic circuits called deep learning processors may be used to speed up the execution of the deep learning algorithms and may be referred to as neural processing units (NPUs) or tensor processing units (TPU).

The sensor nodes may be configured to detect leaks in pipes (e.g., pipes carrying cold water, hot water, wastewater, or the like) located within the walls of the building. For example, when the sensor node wakes up from the dormant mode at the predetermined time interval, the sensor node measures a resistance of the wood beam (e.g., using an ohmmeter), such as between two screws used to attach the sensor node to the wood beam. The resistance of the wood is used to determine an amount of moisture in the wood. The sensor node may compare a current resistance (moisture) level with a previously captured (and stored) resistance (moisture) level. If the difference between the current resistance (moisture) level and the previous resistance (moisture) level indicates that the amount of moisture in the wood is increasing, then the sensor node may send a notification to the central hub which may send the notification to the occupant's device or to the device of a representative of a monitoring company. The occupant or the representative of the monitoring company may, in response to the notification, perform additional investigation and take actions to address the leak and any damage caused. In some cases, the sensor node may determine a rate of change of the wood moisture level. For example, a rapid increase in wood moisture level may be more significant than a specific moisture threshold because the rapid increase may indicate a significant leak.

In addition, the hub may compare measurements of the ambient temperature, the ambient humidity, and the wood resistance (moisture) level taken by the sensor nodes deployed in the same building. For example, if a majority (e.g., >50%) of the sensor nodes measure approximately a first humidity level (e.g., 10% humidity) while a minority (e.g., <50%) of the sensor nodes measure a second humidity level (e.g., 30% humidity) that is significantly higher than the first humidity level, then the location of the minority of the sensor nodes may be further investigated to determine if a leak is present.

While many of the examples for using the systems and techniques described herein are with reference to wood beams in a building, it should be understood that the systems and techniques may also be used to monitor other wooden items of value, including, for example, telephone poles, transmission poles (e.g., used to hold cables to transmit power, telecommunications, or the like), aging barrels, railway ties, antiques (including wood carvings and other wood items), and the like. For example, railway ties may often be located in the middle of nowhere and the damage caused by wood-boring pests may cause a locomotive and the accompanying cars to be derailed, resulting in tens of thousands or even hundreds of thousands of dollars of damage to the train cars, the contents being carried by the cars, the environment in which the derailment occurs, or any combination thereof. An individual sensor node may capture audio signals that include vibrations in the wood beam to which the sensor node is attached. In some cases, the sensor node may use artificial intelligence (AI) to determine the cause of the vibrations. In other cases, the sensor node may send a portion of the audio signal to the central hub and the central hub may analyze the audio signal using AI to determine the cause of the vibrations.

Furthermore, the systems and techniques described herein may be used to detect pest activity in outdoor areas. For example, sensor nodes may be attached to wooden beams placed in the ground in an outdoor area. The wooden beams may be standalone beams, part of a fence, or a combination thereof. In some cases, an attractant ("bait"), such as the wood from a rubber tree or other attractant, may be included in individual wooden beams. An individual sensor node may capture audio signals that include vibrations in the wood beam to which the sensor node is attached. In some cases, the sensor node may use artificial intelligence (AI) to determine the cause of the vibrations. In other cases, the sensor node may send a portion of the audio signal to the central hub and the central hub may analyze the audio signal using AI to determine the cause of the vibrations.

As a further application of the systems and techniques described herein, the systems and techniques described herein may be used to detect and identify vibrations caused by below-ground activities, such as tunneling, transportation of goods, transportation of humans, or the like. For example, sensor nodes may be attached to wooden beams placed in the ground in an outdoor area. The wooden beams may be standalone beams, part of a fence, or a combination thereof. An individual sensor node may capture audio signals that include vibrations in the wood beam to which the sensor node is attached. In some cases, the sensor node may use artificial intelligence (AI) to determine the cause of the vibrations. In other cases, the sensor node may send a portion of the audio signal to the central hub and the central hub may analyze the audio signal using AI to determine the cause of the vibrations. For example, the AI may be trained to recognize the sound of humans or machines creating a tunnel, transporting goods using a transportation mechanism, or the like.

As a first example, a method includes receiving, by one or more processors of a central hub and from a sensor node that is mounted to a wood item inside a wall of a building, a notification including sensor data. The sensor data includes: (1) an ambient temperature inside the wall of the building as measured by a thermometer of the sensor node, (2) an ambient humidity inside the wall of the building as measured by a hygrometer of the sensor node, (3) a resistance of the wood item between two metal fasteners used to fasten the sensor node to the wood item as measured by an ohmmeter of the sensor node, and (4) audio data captured by a microphone of the sensor node that is coupled to the wood item. The central hub performs an analysis of the sensor data using an artificial intelligence algorithm executed by the one or more processors. The central hub determines, by the one or more processors and based on the analysis, a presence of a pest in the wood item and sends a message indicating the presence of the pest to a computing device. The computing device may be associated with: an occupant of the building or a service provider providing a pest monitoring service. The wood item may be a wood stud that is a part of a structure of the building. The artificial intelligence algorithm may include a convolutional neural network. In some cases, the central hub may filter the audio data using an audio filter before performing the analysis. The audio filter may retain ultrasonic frequencies between about 20 kilohertz to about 40 kilohertz while filtering out frequencies below 20 kilohertz and above 40 kilohertz. The audio filter may use a sampling frequency of at least 80 kilohertz and preferably at least 96 kilohertz.

As a second example, a central hub includes: one or more processors and one or more non-transitory computer readable media storing instructions executable by the one or more processors to perform various operations. The operations include receiving, from a sensor node that is mounted to a wood item inside a wall of a building, a notification that includes sensor data. The sensor data includes: (1) an ambient temperature inside the wall of the building (as measured by a thermometer of the sensor node), (2) an ambient humidity inside the wall of the building (as measured by a hygrometer of the sensor node), (3) a resistance of the wood item between two metal fasteners used to fasten the sensor node to the wood item (as measured by an ohmmeter of the sensor node, and (4) audio data captured by a microphone of the sensor node that is coupled to the wood item. The central hub performs an analysis of the sensor data using an artificial intelligence algorithm executed by the one or more processors. The central hub determines, based on the analysis, a presence of a pest in the wood item and sends a message indicating the presence of the pest to a computing device. The message may include an indication that termite activity is detected in an ultrasonic frequency range of the audio data. The pest may include at least one of: carpenter ants, termites, wood-boring beetles, carpenter bees, wood wasps, or any combination thereof. The central hub may determine a moisture level of the wood item based on the resistance of the wood item. 12. The central hub may receive, from a second sensor node that is mounted to a second wood item inside a second wall of the building, a second notification that includes second sensor data. The second sensor data may include: a second ambient temperature, a second ambient humidity, a second resistance of the second wood item, and second audio data associated with the second wood item. The central hub may perform a second analysis of the second sensor data using the artificial intelligence algorithm and determine, based on the second analysis, an absence of the pest in the second wood item. In some cases, the central hub may create a sensor node map that includes: a location of the sensor node in the building and a second location of the second sensor node in the building.

As a third example, one or more non-transitory computer readable media of a central hub are used to store instructions executable by one or more processors to perform various operations. The operations include receiving, from a sensor node that is mounted to a wood item inside a wall of a building, a notification including sensor data. The sensor data includes: (1) an ambient temperature inside the wall of the building as measured by a thermometer of the sensor node, (2) an ambient humidity inside the wall of the building as measured by a hygrometer of the sensor node, (3) a resistance of the wood item between two metal fasteners used to fasten the sensor node to the wood item as measured by an ohmmeter of the sensor node, and (4) audio data captured by a microphone of the sensor node that is coupled to the wood item. The central hub performs an analysis of the sensor data using an artificial intelligence algorithm, determines, based on the analysis, a presence of a pest in the wood item and sends a message indicating the presence of the pest to a computing device. Determining the presence of the pest in the wood item may include: (1) determining that the ambient temperature is at least 65 degrees fahrenheit, (2) determining, based on the resistance of the wood item, that a moisture content of the wood item is at least 15 percent, and (3) determining that the ambient humidity is at least 50 percent. The central hub may receive a request message requesting information about a particular location in the building from the computing device, determine an address of a particular sensor node located in the particular location, broadcast a query message with the address of the particular sensor node, receive a sensor node response from the particular sensor node that includes the requested information, and send a response to the computing device that includes at least the requested information. The pest may include at least one of: carpenter ants, termites, wood-boring beetles, carpenter bees, wood wasps, or any combination thereof. The audio data indicates a presence of termite activity in an ultrasonic frequency range of the audio data. The central hub may determine a moisture level of the wood item based on the resistance of the wood item. The artificial intelligence algorithm may be a neural network trained to detect at least one type of wood-boring pest. The wood item may be a part of a structure of the building.

FIG. 1 is a block diagram illustrating a building 100 that includes multiple sensor nodes deployed within the walls of a building, according to some embodiments. FIG. 1 illustrates a top view of a cross-section of the building 100.

The building 100 includes multiple wood beams, such as representative wood beams 102(1) and 102(2). A sensor node 104 is mounted to at least some of the wood beams 102. For example, as illustrated in FIG. 1, a sensor node 104(1) is fastened to wood beam 102(1) and a sensor node 104(2) is fastened to wood beam 102(2). The sensor nodes 104 may be fastened to the wood beams 102 such that a distance between individual nodes, such as between a first node (e.g., sensor node 104(1)) and a second node (e.g., sensor node 102(2)) that is closest to the first node is no more than a predetermined distance 106. For example, the predetermined distance 106 may be less than about 30 meters (m) and preferably between about 2 m to 10 m. In some cases, the wood beams 102 and the sensor nodes 104 may be enclosed within the building 100 by interior walls 110 and by exterior walls 112. Of course, some areas of the building 100 may not include interior walls, such as an attic, an unfinished basement, or the like.

The multiple sensor nodes 104 that are mounted to the wood beams of the building 100 wirelessly communicate with at least one central hub 108 (a type of access point and/or gateway device). In a large building, multiple central hubs may be used, with each central hub 108 monitoring no more than a particular number (e.g., N>0, such as N=4, 8, 12, or the like) of sensor nodes 104. The central hub 108 may include a communication interface 114, an artificial intelligence (AI) 116 (which may be a Neural Processing Unit (NPU)), and an audio filter 118. The central hub 108 may receive, via the communication interface 114, sensor data 130 from individual sensor nodes 104. For example, the sensor data 130 may include audio data 136, temperature data 138, humidity data 140, wood resistance 142, or any combination thereof. In some cases, the audio filter 118 may be used to filter the audio data 136 (included in the sensor data 130) and the AI 116 used to analyze the filtered audio data to determine whether the filtered audio data indicates pest activity, such as wood-boring pest activity. For example, termite activity can be detected in the ultrasonic frequency range, between about 20 kilohertz (kHz) to about 40 kHz. By filtering the captured audio data to exclude other frequencies (e.g., using a high-pass or bandpass filter), the frequency band between 20-40 kHz can be analyzed to determine if termite activity is present. In some cases, the sensor node may detect the audio signatures of pest activity in the lower, audible range (e.g., 1 kHz-20 kHz), though this audio range may be somewhat noisier than the ultrasonic range. The sensor node may use a sample rate of 192 kHz, 96 KHz, 48 kHz, which give, per their Nyquist frequency, valid sample data up to 96 kHz, 48 KHz, 24 kHz, respectively. Of course, these are merely examples, and other sampling rates may be used in keeping with the systems and techniques described herein. By filtering the audio data 136 to exclude other frequencies (e.g., using a bandpass filter), the filtered audio can be analyzed using the AI 116 to determine if termite activity is present. The technique of filtering the audio data 136 using the audio filter 118 and using the AI 116 to analyze the filtered audio may be used to detect other types of pests, including other types of wood-boring pests (carpenter ants, beetles, and the like) and other types of pests (e.g., mice, rats, cockroaches, and the like). For example, the audio filter 118 may be adjusted to filter the audio data 136 to include the frequencies of sounds made by a particular type of pest while excluding other frequencies. In this way, the audio filter 118 may be tuned to focus on one or more particular type(s) of pest(s). In some cases, the audio filter 118 and AI 116 may be configured at the factory to identify a particular type of pest and the owner of the building may optionally purchase ("unlock") other filter and AI settings to detect other types of pests. For example, the audio filter 118 and the AI 116 may be initially configured to detect termite activity. The owner of the building may optionally pay a fee (either a one-time fee or a recurring fee) to enable (e.g., "unlock") the audio filter 118 and the AI 116 to detect other types of pests, such as other types of wood-boring pests or other types of pests (e.g., mice, rats, cockroaches, and the like).

Table 1 provides the resistance of various types of woods at different moisture levels. As can be seen in Table 1, a 1% increase in the moisture level typically results in the resistance decreasing by more than 50% and typically about 75%. Thus, if a current resistance is a threshold percentage (e.g., 75%, 50%, 25%, or the like) of a previously determined resistance, then the sensor node 104 determines that the moisture level of the wood has increased significantly. For example, for white pine, if the current resistance level is X (e.g., ~5,000 MΩ and the previous resistance level is 4X (e.g., ~20,000 MΩ), then the current resistance level is about 25% (=5,000/20,000) of the previous resistance level and indicates about a 1% increase in moisture, e.g., from about 7% to about 8%, from about 8% to about 9%, and so on.

In some cases, the AI 116 may be used to analyze humidity data 140, temperature data 138, wood resistance 142, or any combination thereof (included in the sensor data 130) to determine whether one or more of pipes (e.g., cold water pipes, hot water pipes, wastewater pipes), such as a representative pipe 132, located inside the walls 110, 112 is leaking. The humidity data 140 may include an amount of ambient humidity present within the walls 110, 112, an amount of resistance 142 between two metal fasteners that fasten one of the sensor nodes 104 to one of the wood beams 102, or both.

If the hub 108 determines, based on an analysis of the sensor data 130, that pest activity has been detected or that a leak in one of the pipes 132 has been detected, then the hub 108 may send, via the communication interface 114, a notification 126 over one or more networks 120 to a monitoring company 122 (e.g., pest monitoring company), a server 123, a user device 124 (e.g., smart phone associated with an occupant or a manager of the building), or any combination thereof. In some cases, the notification 126 may include a portion of the sensor data 130 or one or more values of readings (e.g., wood-boring pest activity, such as termite activity, detected in the ultrasonic frequence range, a temperature reading of X detected (X>0), a humidity reading of Y detected (Y>0), a wood resistance of Z detected (Z>0)), associated with the sensor data 130. The server 123 may accumulate the data received from multiple hubs (including the representative hub 108), use the accumulated data to retrain the AI 116 and send the retrained AI 116 as an update to the hub 108. In this way, the AI 116 may be periodically (e.g., every 3 months, 6 months, 12 months, or the like) be updated with additional data.

To conserve the battery used to power each sensor node 104, each sensor node 104 may periodically, at a predetermined time interval (e.g., every N seconds, N>0), transition from a dormant mode to a wake mode, measure a temperature 138 of the associated wood beam 102 (to which the sensor node is attached) using a thermometer and measure a humidity level 140 (ambient humidity level, humidity level of the associated wood beam 102) using a humidity sensor (hygrometer). If the temperature level 138 satisfies a temperature threshold and the humidity level 140 satisfies a humidity threshold that are both conducive for a particular type of pest to be present, then the sensor nodes 104 may use a microphone to capture audio data 136 (including ultrasonic frequencies) and analyze the audio data 136 to determine whether pest activity is present in the building 100. For example, termites prefer temperatures between 75 degrees to 95 degrees fahrenheit and humid environments, such as those caused by water leaks within the walls 110, 112. Thus, a temperature 138 of around 75 degrees fahrenheit or greater and the presence of humidity 140 in the wood are conditions

TABLE 1

RESISTANCE OF VARIOUS TYPES OF WOODS AT DIFFERENT MOISTURE LEVELS

| Wood Type | 7% Moisture | 8% M. | 9% M. | 10% M. | 15% M. |
| --- | --- | --- | --- | --- | --- |
| Spruce, black | 700,000 MΩ | 90,000 MΩ | 16,000 MΩ | 4,300 MΩ | 68 MΩ |
| Pine, white | 20,900 MΩ | 5,620 MΩ | 2,090 MΩ | 850 MΩ | 33 MΩ |
| Fir, white | 57,600 MΩ | 15,850 MΩ | 3,980 MΩ | 1,120 MΩ | 27 MΩ |
| Hemlock, western | 22,900 MΩ | 5,620 MΩ | 2,040 MΩ | 850 MΩ | 28 MΩ |
| Oak, white | 17,400 MΩ | 3,550 MΩ | 1,100 MΩ | 415 MΩ | 12 MΩ |
| Maple | 72,400 MΩ | 13,800 MΩ | 3,160 MΩ | 690 MΩ | 12 MΩ |
| Mahagony | 20,900 MΩ | 6,760 MΩ | 2,290 MΩ | 870 MΩ | 22 MΩ |
| Walnut, black | 51,300 MΩ | 9,770 MΩ | 2,630 MΩ | 890 MΩ | 22 MΩ | conducive to termites. In this example, if the sensor node 104 determines that the temperature is between 75 to 95 degrees fahrenheit and the humidity is greater than a particular level, then the sensor node 104 may capture and analyze the audio data 136 to determine if active termites are present. For example, termites prefer an ambient humidity level between about 75% to about 95%. Termites also prefer wood moisture levels of at least 20%. Of course, other pests may have other associated temperature 138 and humidity 140 conditions under which they thrive.

In some cases, the monitoring company 122 (or a user associated with the user device 124) may desire to obtain a current status of individual sensor nodes 104, such as a current ambient temperature 138, a current ambient humidity, a current wood humidity level 140 of individual wood beams 102, whether pest activity has been detected, and so on. In such cases, the monitoring company 122 (or the user device 124) may send a query 128 to the hub 108 which relays the query 128 to one or more of the sensor nodes 104. In some cases, the sensor nodes 104 may be addressable individually. For example, the query 128 sent by the hub 108 may include a location 129. The location 129 may specify an address of one or more of the sensor nodes 104. In such cases, the hub 108 may send the query 128, based on the location 129 specified in the query 128, to a subset (one or more) of the sensor nodes 104 associated with a particular area of the building 100. For example, if the query 128 includes a request for information regarding the conditions in an attic (=location 129), then the hub 108 may send the query 128 to a subset of the sensor nodes 104 that are located in the attic. As another example, if the query 128 includes a request for information regarding the conditions in a front (=location 129) of a building, then the hub 108 may send the query 128 to a subset of the sensor nodes 104 that are located within the walls 112 that are in the front of the building 100. In response to receiving the query 128, the sensor nodes addressed by the query 128 may send a response 131 (that may include at least some of the sensor data 130) to the hub 108. If the sensor nodes 104 are in a low-power (dormant) mode, then the query 128 may cause one or more of the sensor nodes 104 near the hub 108 to temporarily transition to a wake-on mode in which the sensor nodes 104 can communicate with each other using a signal 134 broadcast using a short-range radio. For example, the sensor node 104(1) may receive the query 128 and send the signal 134(1) to the sensor node 104(2), the sensor node 104(2) may receive the signal 134(1) and send the signal 134(2), and so on. In this way, intermediate sensor nodes 104 may relay (in a daisy chain manner) the query 128 from a recipient sensor node 104 that received the query 128 to destination sensor node(s) 104 that are addressed by the query 128. Thus, the sensor nodes 104 may, in a daisy-chain fashion, relay the query 128 to the destination sensor node(s) 104 whose location 129 is specified in the query 128. The daisy-chaining of a message may be used because the signal levels to wake up a sensor node from a dormant state may be (wake-on transmission) signals that use a higher amount of power than normal transmission signals. Once the destination sensor node is awake, the destination sensor node can talk directly to the hub and vice versa, without using daisy chained messaging.

Figure 2:
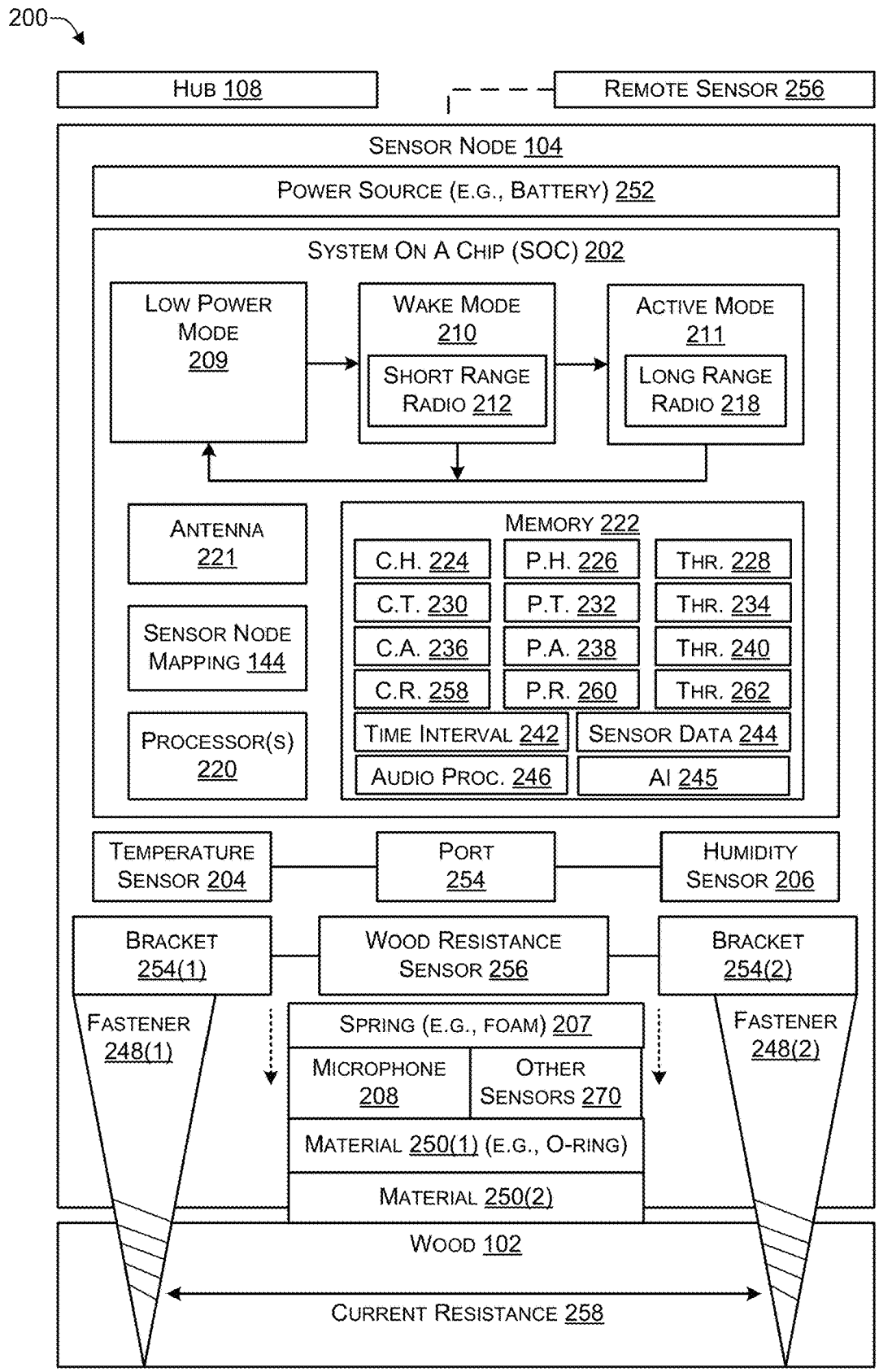
FIG. 2 is a block diagram illustrating a sensor node attached to a wood beam, according to some embodiments.

FIG. 2 is a block diagram 200 illustrating a sensor node attached to a wood beam, according to some embodiments. In the block diagram 200, the sensor node 104 is attached to the wood beam 102 using two metal fasteners 248(1), 248(2), such as screws, nails or another type of metal fastener.

The sensor node 104 may include a system-on-a-chip (SOC) 202 or discrete components that are included in the SOC 202. For example, the SOC 202 may include a 32-bit core or a 64-bit core processor(s) 220 (e.g., ARM®, AMD®, or Intel® processors), a memory 222 that includes a program memory to store executable code, a data memory to store data, and additional storage to store user data. In some cases, the processors 220 may include a specialized hardware processor to execute an artificial intelligence (AI) algorithm, such as a Neural Processing Unit (NPU) or similar. The SOC 202 may include a radio and antenna 221 that operates on multiple frequency bands (e.g., 413-479 Megahertz (MHz), 826-958 MHz, and the like), and uses one or more modulation schemes, such as On-Off Keying (OOK) (or another type of amplitude-shift keying (ASK)), Frequency Shift Keying (FSK), and the like. The SOC 202 may include a communications interface that is compatible with multiple proprietary and/or standardized wireless protocols (e.g., Wireless Meter Bus (W-MBUS), Sigfox, Mioty, KNX-RF, IEEE 802.15.4g, and the like). The SOC 202 may include a Low Power Autonomous Wake up Receiver (LPAWUR), featuring an OOK data receiver channel with a current consumption of, for example, up to 4 micro-Amperes (µA) in an active mode 211, up to 14 nano-Amperes (nA) in low power mode 209, and up to 960 nA in wake mode 210. These numbers are purely for illustration purposes and it should be understood that, in general, the current consumption in active mode 211 is greater than the current consumption in wake mode 210, and the current consumption in wake mode 210 is greater than the current consumption in low power mode 209. The wake-measure-sleep cycle of the algorithms is designed to conserve battery power and reduce power consumption. The time intervals may vary depend on the application and the location of the wood component that the sensor node is monitoring. The SOC 202 may feature a wake-up capability from the low power mode 209 to the wake mode 210. The SOC 202 may include a battery voltage monitor with low-level detection. In the wake mode 210, the SOC 202 may communicate using a short-range radio 212 via OOK with a range of between about 10 to 30 meters. In the active mode 211, the SOC 202 may communicate using a long-range radio 218 via FSK with a range of up to 1 kilometer.

The sensor node 104 may include multiple sensors, such as a temperature sensor 204 (thermometer), a humidity sensor 206 (e.g., a hygrometer), a microphone 208 (or another type of audio transducer), a wood resistance sensor 256 (e.g., an ohmmeter), or any combination thereof. In some cases, the sensor node 104 may include other sensors 270, such as a tilt sensor (to determine whether a wooden component is leaning instead of being perpendicular to the earth), an accelerometer for vibration and orientation sensing (e.g. telephone pole leaning or swaying in wind or a storm indicating a potential failure soon), or other types of sensors. The sensor node 104 may include a port 254 to enable the temperature sensor 204 and the humidity sensor 206 (e.g., hygrometer) to determine an ambient temperature and an ambient humidity, respectively, of an environment external to an enclosure of the sensor node 104. The port 254 provides an opening that enables the temperature sensor 204 and the humidity sensor 206 to access an environment (air) external to a case of the sensor node 104, thereby enabling the temperature sensor 204 to measure an ambient temperature of an environment outside a housing of the sensor node 104 and enabling the humidity sensor 206 to measure an ambient humidity of the environment outside the sensor node 104.

A spring 207, such as compressible foam, may be used to exert pressure on the microphone 208 to provide a large and consistent contact surface, over time, between the microphone 208 and the wood 102. Before the sensor node 104 is coupled to the wood 102, the material 250(2) may be proud of (e.g., extend beyond) an enclosure of the sensor node 104. After the sensor node 104 is fastened to the wood 102 using the fasteners 248, the material 250(2) may be approximately flush with the enclosure of the sensor node 104. The microphone 208 may be coupled to the wood 102 using one or more materials 250. For example, a material 250(1), in the shape of an O-ring, may be used as a gasket to reduce the level of extraneous noise captured by the microphone 208. The material 250(2) may be used to impedance match the microphone 208 to the wood 102 for ultrasonic frequencies. The purpose of the material 205(2) is to couple the wood 102 to the microphone 208 with a material that closely matches impedance and increases (e.g., maximizes) a transmission component of ultrasonic frequencies (e.g., 20-40 kHz) while minimizing a reflection component.

The sensor node 104 includes a power source 252, such as a battery. In some cases, the power source 252 may be charged wirelessly. In some cases, the power source 252 may include a cable providing alternating current or direct current from the power grid or from a local power supply. For example, a power supply that is connected to an external electrical grid may be placed inside the building 100 of FIG. 1 and cables may be run from the power supply to one or more of the sensor nodes 104 in the building 100. In this way, at least a portion of the sensor nodes 104 may receive power from the power supply that is connected to the electrical grid, while a remainder of the sensor nodes 104 may be battery-powered.

Fasteners 248(1), 248(2), such as screws or another type of metal fastener, are used to mount the sensor node 104 to the wood 102. The fasteners 248(1), 248(2) may pass through a metal bracket 254(1), 254(2), respectively. The wood resistance sensor 256 is electrically connected to each of the brackets 254(1), 254(2) to enable the wood resistance sensor 256 to measure a resistance of the wood 102 between the fastener 248(1) and the fastener 248(2). The resistance is used by the wood resistance sensor 256 to calculate (determine) a moisture level present in the wood 102.

The memory 222 may be used to store a current humidity 224, a previous humidity 226 (e.g., determined at a previous point in time), and a humidity threshold 228. For example, the processors 220 may compare the current humidity 224 with the previous humidity 226 to determine if the difference is greater than the humidity threshold 228 or to determine a rate of change in the humidity to determine whether a leak is present or whether the humidity is suitable for a pest, such as termites or another type of pest. The current humidity 224 in the previous humidity 226 may be captured by the humidity sensor 206 (e.g., hygrometer). The memory 222 may be used to store a current temperature 230, a previous temperature 232 (e.g., determined at a previous point in time), and a temperature threshold 234. For example, the SOC 202 may compare the current temperature 230 with the previous temperature 232 to determine if the difference is greater than the temperature threshold 234 to determine whether the temperature is suitable for a particular type of pest, such as termites. The current temperature 230 and the previous temperature 232 may be captured by the temperature sensor 204. The memory 222 may be used to store current audio data 236, previous audio data 238 (e.g., gathered at a previous point in time), and an audio threshold 240. For example, the SOC 202 may compare the current audio 236 with the previous audio 238 to determine whether the difference is greater than the audio threshold 240 to determine whether the audio data indicates pest activity, such as termite activity. The current audio 236 and the previous audio 238 may be captured by the microphone 208.

The memory 222 may be used to store a current wood resistance 258, a previous wood resistance 260 (e.g., gathered at a previous point in time), and a resistance threshold 262. For example, the SOC 202 may compare the current wood resistance 258 with the previous wood resistance 260 to determine whether the difference is greater than the resistance threshold 258 to determine whether the wood resistance 260 indicates a humidity level attractive to particular types of pests, such as termites. The current wood resistance 258 and the previous wood resistance 260 may be captured by the wood resistance sensor 256.

The memory 222 may be used to store a time interval 242. For example, the SOC 202 may automatically transition from the low-power mode 209 to the wake mode 210 periodically, e.g., at the time interval 242. In the wake mode 210, the SOC 202 may capture sensor data 244, including, for example, the current humidity 224 using the humidity sensor 206 (e.g., hygrometer), the current temperature 230 using the temperature sensor 204, the current audio data 236 using the microphone 208, and the current wood resistance 258 using the wood resistance sensor 256. After capturing the sensor data 244, the SOC 202 may transition from the wake mode 210 back to the low-power mode 209.

The memory 222 may include audio processing 246. For example, the microphone 208 may capture audio data at a sampling rate of 96 kHz. The audio processing 246 may filter the audio data to keep audio data in the 10 kHz to 40 kHz while filtering out frequencies below 10 kHz and frequencies above 40 kHz. In some cases, the audio processing 246 may perform additional processing (e.g., compression, down-sampling, or the like) to reduce a size of the audio data. Reducing the size of the audio data provides two advantages. First, less memory is used to store the audio data. Second, less bandwidth is used when the sensor node 104 transmits the audio data to the hub 108.

Daisy-Chain Wake on Radio (WoR) to Enable Long Distance Transmissions

In some cases, WoR (wake mode 210) may use On-off keying (OOK) and may not have a good sensitivity because it is low-power in nature. Normal RF operations in active mode 211 using the long range radio 218 may use FSK and have a very high sensitivity. For this reason, the Wake-on-Radio (WoR) distance (short range radio 212) may be short range (10 m-30 m) compared to normal communication using the long range radio 218 (up to at least 1 kilometer).

To overcome the short range WoR distance, multiple sensor nodes 104 of FIG. 1 may "daisy-chain" transmissions to transmit a message to and/or from a particular one of the sensor nodes 104 in the building 100. For example, when the hub 108 (a type of access point and/or gateway device) sends an OOK wake-up sequence (query 128) that is received by at least one of the sensor nodes 104, the other sensor nodes 104 may re-broadcast (daisy chain) this sequence, until the sensor node 104 addressed in the query 128 is reached, at which point the addressed sensor node turns on the long range radio 218 and uses FSK to respond to the hub 108. In some cases, power requirements may be further reduced by having the hub 108 create a sensor node map 144. Before sending a message to a particular one of the sensor nodes 104, the hub 108 may determine which sensor nodes 104 are to be queried and use a direct path between the hub 108 and the addressed sensor node 104, instead of a broadcast message (query 128) that is broadcast to all of the sensor nodes 104. Because each of the sensor nodes 108 have a fixed location, the hub 108 (and/or the sensor nodes 104) may learn the mapping once. In addition, a small set of sensor nodes 104 may be used to spread the power or be targeted based on battery levels (e.g., the node with a highest battery level is used to leap-frog the OOK WoR signal). In this way, the wake-on signal may be relayed (daisy chained) by one or more intermediate sensor nodes 104 to a destination sensor node 104 using OOK. After receiving the wake-on signal, the sensor node 104 may transition to the active mode 211 and use the long range radio 218 (FSK) to communicate directly with the hub 108. The intermediate sensor nodes 104 that were involved in relaying (daisy chaining) the message to the addressed sensor node may then go back to the low power mode 209 (e.g., sleep mode).

Thus, the SOC 202 may transmit/receive messages over a first distance (10 m to 30 m) in wake mode 210 due to the short range radio 212 (that uses OOK) and over a second (longer) distance (over 1 kilometer) in active mode 211 using the long range radio 218 (that uses FSK). For this reason, the daisy chain (where one sensor node relays a message from the hub 108 to another sensor node and so on) occurs in the wake mode 210 and then the addressed sensor node 104 transitions to the active mode 211 (that uses FSK) after receiving the message.

Duty Cycle on Wake-On-Radio (WoR) to Reduce Standby Power

In wake mode 210 (WoR) the SOC 202 may draw a small amount of current, e.g., about 5 microamps. The WoR feature may be duty-cycled On/Off to extend the battery life. For example, the WoR may be ON and listening for 2.5 seconds, and then turn WoR OFF for 2.5 sec. Of course, other ON/OFF duty cycles, ranging from 0.5 seconds to 10 seconds may be used. In some cases, the OFF may be longer in duration than the ON to further conserve battery power, e.g., 2.5 seconds ON and 5 seconds OFF. In some cases, a time of day may be taken into account to further extend battery life. For example, ON may be performed during a first time period (e.g., during the day, such as between 8:00 AM to 8:00 PM) and OFF may be performed during a second time period (e.g., during the night, such as between 8:00 PM to 8:00 AM). In this way, battery life may be significantly extended. For example, WoR may consume about 5 μA of power, while DeepStop mode (WoR is off) may consume about 960 nA. The daisy chain wake-up may be performed when (1) an occupant, homeowner, or building manage desires to know a current status, (2) a technician associated with a pest monitoring company is on site (e.g., at the building 100), (3) if there is a firmware update to the sensor nodes 104, or (4) when another condition occurs in which particular ones of the sensor nodes 104 are asked to provide a response. In this way, battery power is conserved because wake-on radio only happens occasionally.

Locate a Sensor Node Using Microphone (Ultrasonic Sensor) and Doppler Effect

The sensor nodes 104 are embedded in structural wood beams 102 and are behind the walls 110, 112. To locate a particular one of the sensor nodes 104, the wake-on feature may be used. Each sensor node 104 has the microphone 108 (e.g., an ultrasonic sensor). A user device, such as phone, a tablet, or another type of device with a speaker, may be used to generate a particular ultrasonic frequency to wake-up the targeted sensor node(s) 104 and to enable their respective microphones 208. The volume and frequency deviation (doppler effect) may be used to determine distance and direction. As the user device (noise source) moves closer to the targeted sensor node 104, the volume will increase and the doppler effect will indicate movement towards the targeted sensor node. In some cases, a microphone in the user device may be used to determine a direction of the noise source.

Interface Material Between Microphone and Wood to Maximize Ultrasonic Signals to Microphone Ultrasonic sound travels in waves and responds to changes in a medium (material) with physical properties, similar to electric signals. An impedance mismatch between two types of materials may result in a reflection component and a transmission component, e.g., a part of a signal is transmitted while a remainder of the signal is reflected. In addition, a signal transmitted through a medium typically incurs some attenuation, resulting in an attenuation component in addition to a reflection component and the transmission component. The material 250(2) couples the wood 102 to the microphone 208 by using a material that closely matches the impedance of the wood 102 to maximize (increase) the transmission component and minimize (reduce) the reflection component. The ultrasonic vibrations caused by a pest are transmitted along the wood beams 102. If there is air between the wood beam 102 and the microphone 208, then there is a transmission loss and a loss due to reflections (reflection loss). For example, if the material 250(2) comprises polyurethane (PU) rubber, then a greater than 90% transmission component may be achieved, because PU rubber typically provides a 99% transmission rate to the microphone 208, resulting in a near lossless interface material (e.g., due to a close impedance match) between the microphone 208 and the wood beam 102. Furthermore, in some cases, the material 250(2) may be shaped to provide a stethoscope (or megaphone) type of effect that acoustically amplifies the audio signals transmitted by the wood 102, resulting in a greater than a 100% transmission rate. In such cases, the shape of the material 250(2) may be designed to capture sound waves from the wood 102 and acoustically amplify them for the microphone 208. In addition, the material 250(2) may act as a barrier to prevent unwanted particles (e.g., water, dirt, moisture, and the like) from getting inside a housing of the sensor node 104.

The spring 207 may exert pressure on the microphone 208 to increase a contact area between the microphone 208 and the wood 102, thereby increasing the transmitted component and reducing transmission loss and reflection loss (reflected component). Prior to the sensor node 104 being attached to the wood 102, the material 250(2) may be proud of (extend beyond an outer surface of) a housing of the sensor node 104. After the sensor node 104 is attached (coupled) to the wood beam 102 using the fasteners 248, the material 250(2) may retract and/or compress to form a barrier to prevent foreign materials (e.g., liquids, solids, or particles).

O-Ring to Reduce Noise and Increase SNR of Ultrasonic Signal

The material 250(1) may be shaped in the form of an O-ring to act as a gasket to reduce noise caused by air-based noise, thereby increasing a signal-to-noise ratio (SNR) of the audio signals transmitted by the wood 102. In some cases, the material 250(1) may be in the form of an O-ring that is placed around the microphone 208 when the sensor node 104 is attached to the wood beam 102 to reduce noise and increase the SNR by blocking out extraneous external noise. The material 250(2) may be comprised of material that disperses noise or absorbs noise, such as a viscoelastic material that converts vibrations from noise into heat.

Using Metal Fasteners to Enable Determining Wood Moisture Levels

The metal fasteners 248 (e.g., screws) used to attach the sensor node 104 to the wood 102 enable the wood resistance sensor 256 to measure a resistance of the wood 102 between the two fasteners 248. The resistance of the wood 102 may be used by the processors 220 to determine a moisture level of the wood 102. In some cases, the sensor node 104 may include two metal prongs, separate from the fasteners 248, that contact the wood beam 102 and that may be used for moisture detection, while in other cases the fasteners 248 used to attach the sensor node 104 to the wood 102 may be used for moisture detection. The humidity sensor 206 (hygrometer) may use the fasteners 248 (or the two metal prongs) to measure a resistance of the wood between the two fasteners 248 (or the two metal prongs) to determine a resistance (e.g., current resistance 258). The fasteners 248 may be screws as screws achieve better contact with the wood beams 102 than nails or other conical metal prongs. In addition, using the fasteners 248 to determine the wood resistance (to determine a wood moisture level) saves costs, is more reliable long term, and makes it easier to mount the sensor node 104 to the wood 102 (because separate metal prongs require a significant amount of force to enable them to penetrate into the wood 102). In some cases, radar waves may be used to measure moisture content of wood. In some cases, radar or ultrasonic waves may be used to measure moisture content of the wood 102.

Utilize Wood Moisture Level Along with Humidity Level Rate of Change to Determine Water Leaks Faster An increase in a moisture level of the wood 102 (as measured using the fasteners 248) without a significant change in ambient humidity (as measured using the port 254) may be indicative of a water leak. Water can use capillary action to travel up wood beams 102. In this way, the sensor nodes 104 can be used to detect water leaks behind the walls 110, 112 before (i) wood begins to rot, (ii) mold begins to grow, (iii) wood-boring pests begin to infest, or any combination thereof. In some cases, a remote sensor 256 may be attached to the sensor node 256 using a cable or wirelessly (e.g., using Bluetooth or WiFi). For example, the remote sensor 256 may be mounted behind (or below) the walls of a bathroom to provide sensor data to a nearby sensor node, such as the sensor node 104, to enable remote monitoring of a particular location that may be prone to water leaks. The remote sensor 256 may be mounted under a sink, under a bathtub/shower, near a hot water heater, near an air conditioning unit, or other locations prone to water leaks.

Update Temp/Humidity/Moisture Level Only when a Delta from a Previous Reading Satisfies a Threshold To prolong battery life and save power, the sensor nodes 104 may send sensor data 130 to the hub 108 when one or more values change by at least a threshold amount. For example, the sensor node 104 may transmit sensor data 130 if the difference between a current reading 224, 230, or 236 and a previous reading 226, 232, 238 is greater than the corresponding threshold 228, 234, 240, respectively. To illustrate, small changes between a previous measurement and a current measurement may be ignored while large changes may result in the sensor data 130 being sent to the hub 108. The previous readings 226, 232, 238 may be an initial reading or a reading taken before the predetermined time interval 242.

Filter Audio Signal to Reduce Payload

In some cases, the sensor node 104 may use a sampling rate of 192 kHz to provide a useful signal up to 96 kHz (Nyquist frequency). For termites, the frequency range of interest is between 10 kHz and 40 kHz so the audio signal may be filtered to include frequencies between 10 kHz to 40 kHz, reducing the payload being transmitted in the sensor data 130. In some cases, the filtered audio may be compressed by, for example, down-sampling the filtered audio, to further reduce a size of the audio signal prior to transmission.

Transmit when Audio Signals are Above a Threshold Level to Reduce Payload

If the microphone 208 does not detect audio signals greater than a threshold amount (e.g. the noise floor), then the audio signals may not be sent to the hub 102 and, in some cases, may not be stored in the memory 222. The audio signals captured by the microphone 208 may be sent to the hub 108 when a volume (in decibels) is greater than a predetermined threshold that is indicative of pest activity. This may be done to further increase battery life by not expending energy to transmit audio signals that are unlikely to indicate the presence of pests.

Use Temp/Humidity/Wood Moisture Levels to Determine Audio Sample Frequency

The rate at which the microphone 208 captures audio samples may vary based on the current temperature 230 and current humidity 224. For example, if the wood moisture level is less than 15% and/or the ambient temperature is below 65 degrees, then the sensor node 104 may sample audio (using the microphone 208) less frequently, because wood-boring pests, such as termites, are unlikely to be active under those conditions. If the temperature level and humidity level are conducive for a particular pest, then the sensor node 104 may sample more frequently. For example, if the wood moisture level is greater than 20% and/or the ambient temperature is between 75-85 degree, then the conditions are ideal for termites and the sensor node 104 may use the microphone 208 to more frequently capture audio samples from the wood 102.

Multiple sensor nodes 104 may be used to triangulate a location of pest activity. For example, if a first sensor node 104 receives a 10 decibel (db) ultrasonic signal and a second sensor node 104 receives a 5 db signal, then the hub 108 may use this information (e.g., triangulation) to determine an approximate location of the pest activity within the building 100.

In some cases, the hub 108 may use a weighted threshold to confirm a pest infestation, such as a termite or other wood-boring pest infestation. If the hub 108 determines that a pest infestation is likely present, then the hub may instruct the sensor nodes 104 to increase a sampling rate. If it appears there is pest activity (e.g., audio data has a decibel level greater than a threshold amount) then the sensor node 104 may increase the rate at which audio samples are captured as the audio samples will likely become louder over time due to increased activity.

Thus, sensor nodes may be attached to a wood beam or other wood item (e.g., wooden barrel, telephone pole, railway tie, or the like) using two (or more) screws or another type of fastener. The SoC of a sensor node may use a short range radio when woken from a low power mode. To send a message from a central hub to a destination sensor node, the sensor nodes may relay the message in a daisy-chain manner, based on a location map of the sensor nodes, until the message reaches the destination sensor node. The destination sensor node may transition to an active mode and use a long range radio to initiate direct communications with the hub, enabling the other sensor nodes to transition back to a low power mode. A wood resistance sensor of each sensor node may be coupled to the wood using one or more materials. For example, a first material may perform impedance matching to reduce transmission loss and reflection loss. In some cases, a second material may be shaped to acoustically amplify the vibrations of pest activity transmitted by the wood. The second material may include an O-ring to acoustically and physically couple the microphone to the wood while insulating the coupling from external noise and particulate matter. Furthermore, a spring (e.g., compressible foam) may be used to exert pressure on the microphone to further reduce transmission loss.

Figure 3:
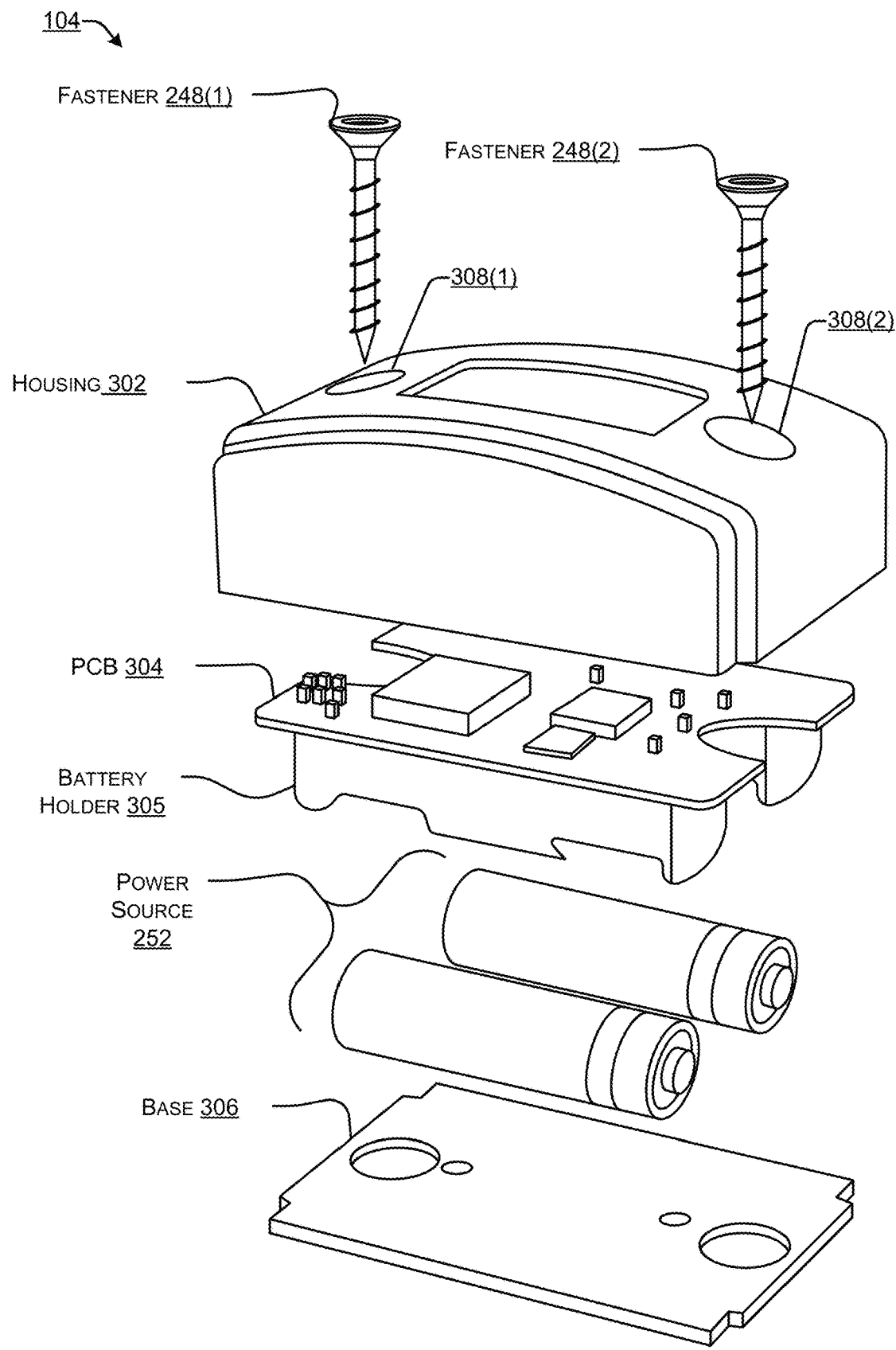
FIG. 3 is a block diagram illustrating components of a sensor node, according to some embodiments.

FIG. 3 is a block diagram illustrating components of a sensor node 104, according to some embodiments. Two fasteners 248(1), 248(2), such as screws, pass through holes 308(1), 308(2), respectively, of a housing 302. The housing 302 is used to protect a printed circuit board (PCB) and includes a battery holder 305 to protect the power source 252 (e.g., one or more batteries). The housing 302 attaches to a base 306. The fasteners 248 couple the housing 302 to the base 306 and may be used to couple the sensor node 300 to a wood-based item, such as the wood beams 102 of FIGS. 1 and 2, aging barrels, telephone poles, railway ties, or other valuable wooden items. Though illustrated for ease of understanding, it should be understood that the base 306 includes the materials 250 of FIG. 2.

Figure 4:
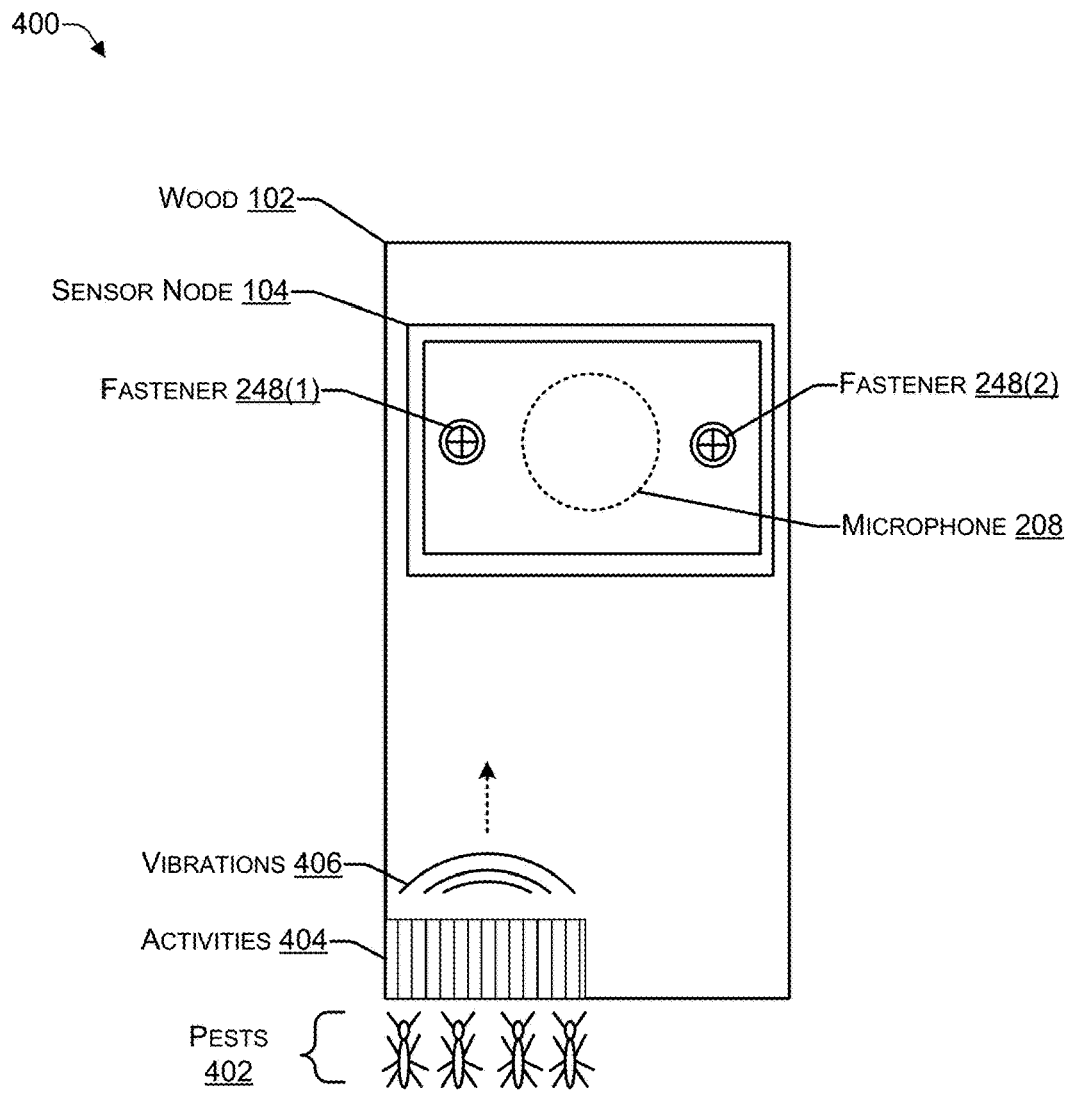
FIG. 4 is a diagram illustrating a sensor node attached to a piece of wood, according to some embodiments.

FIG. 4 is a diagram 400 illustrating a sensor node attached to a piece of wood, according to some embodiments. The diagram 400 illustrates the sensor node 104 attached, using the fasteners 248, to the wood beam 102. Pests 402 may perform one or more activities 404, such as eating portions of the wood 102, causing vibrations 406. The vibrations 406 are transmitted by the wood 102 and are picked up by the microphone 208 located in the sensor node 104. In this way, the sensor node 104 is able to detect the activity of pests 402 performing particular types of activities, such as the activity 404, that involves the wood 102. For example, if the pests 402 are wood-boring pests, and the activity 404 includes consuming the wood 102, then the activity 404 causes the vibrations 406 to be transmitted by the wood 102 to the sensor node 104. As another example, if the pests 402 are rodents (mice, rats, squirrels, or the like), and the activity 404 includes gnawing at the wood 102 or traveling (e.g., running) along the wood 102, then the activity 404 causes the vibrations 406 to be transmitted by the wood 102 to the sensor node 104. In this way, the sensor node 104 may be configured to detect a variety of pests, including rats, mice, cockroaches, and wood-boring pests, such as, for example, carpenter ants, termites, beetles (e.g., ark beetles, wood borers, powderpost beetles, and other wood-boring beetles), carpenter bees, wood wasps, and the like.

Figure 5A:
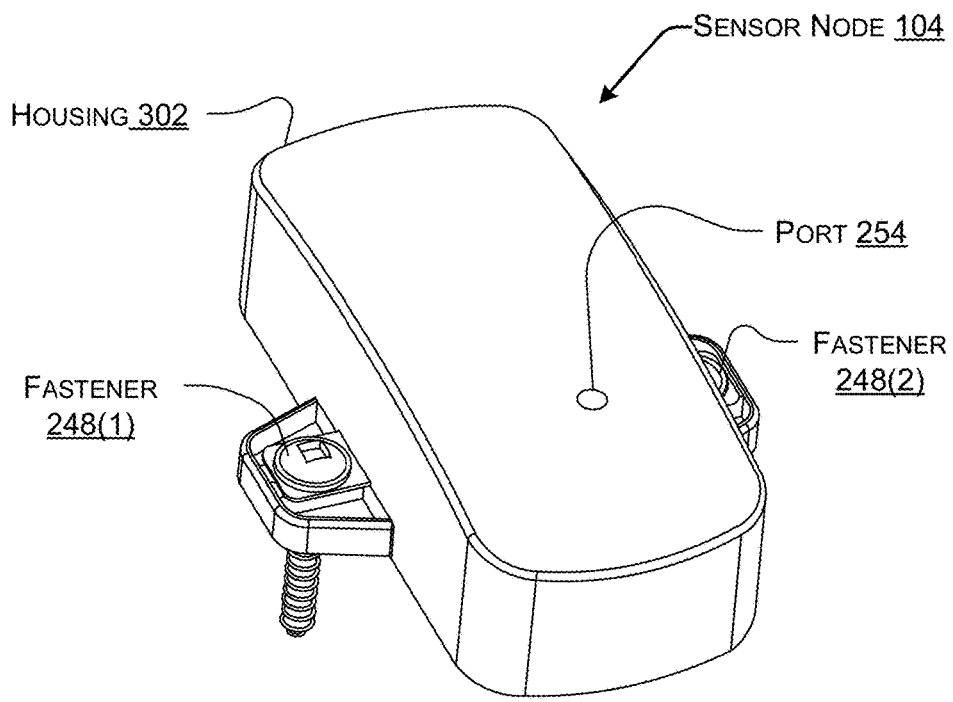
FIGS. 5A and 5B illustrate components of a sensor node, according to some embodiments.
Figure 5B:
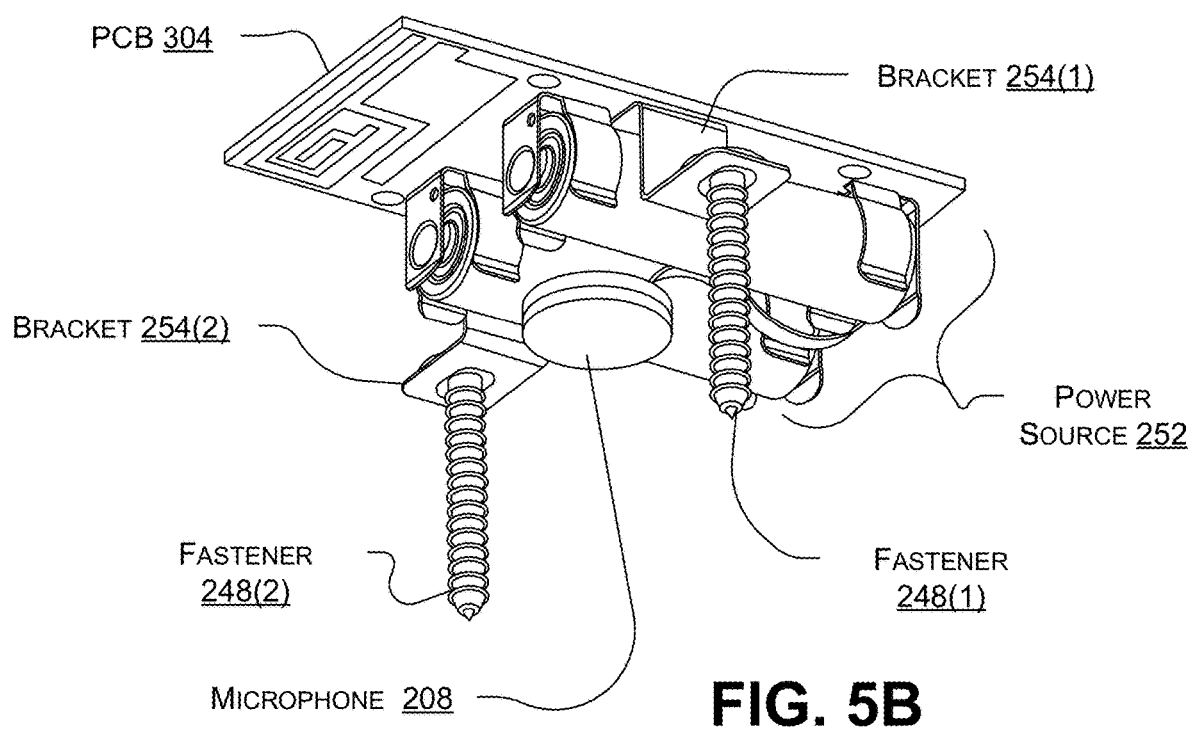

FIGS. 5A and 5B illustrate components of a sensor node, according to some embodiments. FIG. 5A is a top view that illustrates the port 254 in the housing 302. The port 254 enables the sensors in the sensor node 104 to determine an ambient humidity and an ambient temperature of an environment in which the sensor node 104 is located. The port 254 provides an opening that enables the temperature sensor 204 and the humidity sensor 206 to access an environment (air) external to the housing 302 of the sensor node 104, thereby enabling the temperature sensor 204 to measure an ambient temperature of an environment outside the housing 302 of the sensor node 104 and enabling the humidity sensor 206 to measure an ambient humidity of the environment outside the housing 302 of the sensor node 104.

FIG. 5B illustrates components located inside the housing 302, including the metal fasteners 248 passing through the metal brackets 254 before being attached to the wood 102 of FIG. 2. The wood resistance sensor 256 is electrically connected to each of the metal brackets 254 to enable measurement of the current wood resistance 258, e.g., a resistance of the wood 102 between the screws 248. The resistance is used by the wood resistance sensor 256 to determine a moisture level of the wood 102.

After the sensor node 104 is attached to the wood 102 using the fasteners 248, the microphone 208 may come in contact with the wood 102, thereby enabling the microphone 208 to capture the vibrations 406 of FIG. 4 that are caused by the pest activity 404 (e.g., wood-boring pests eating wood) that travel along the wood 102 to the microphone 208.

Figure 6:
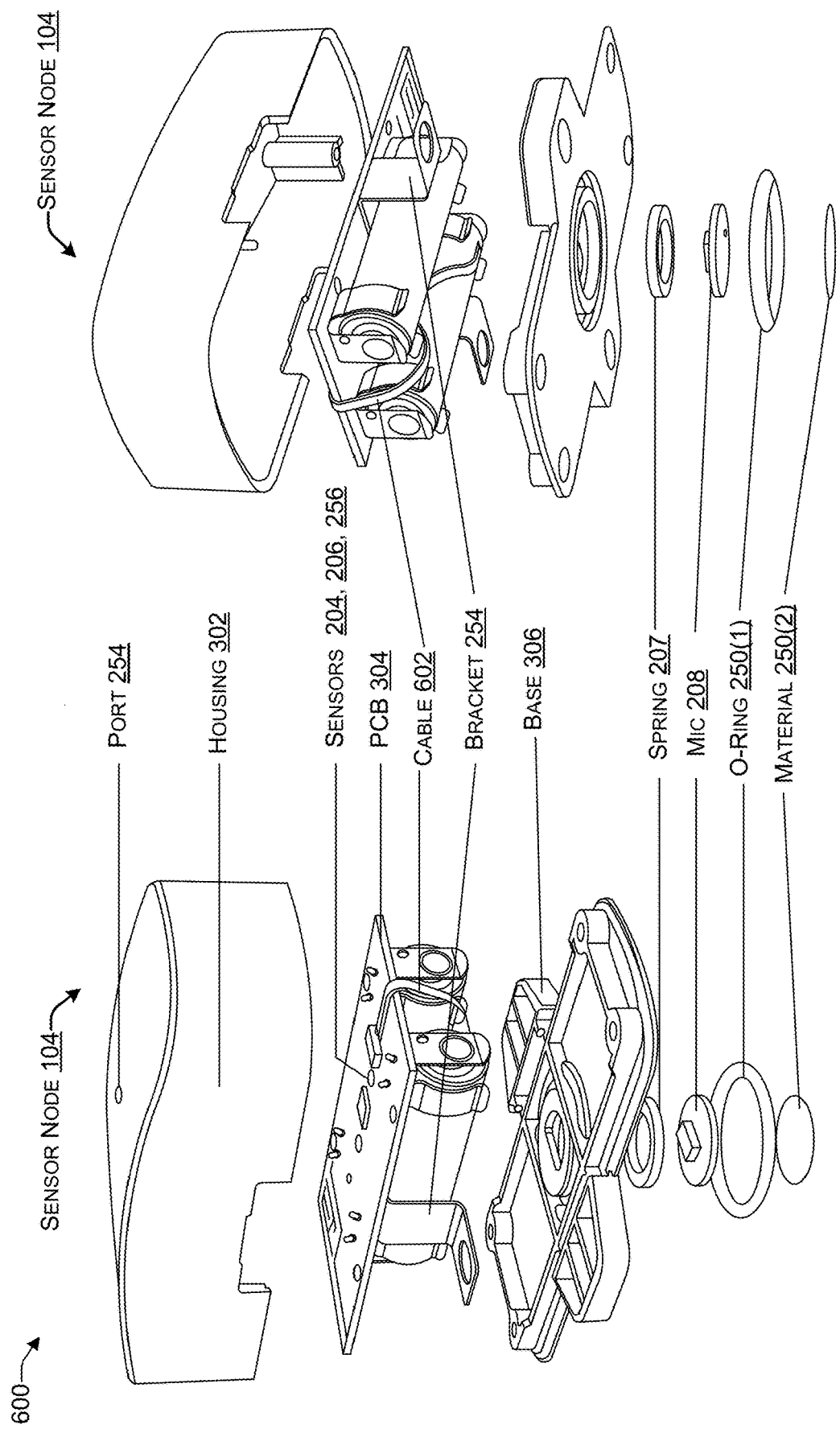
FIG. 6 is a diagram illustrating a view of the components of a sensor node, according to some embodiments.

FIG. 6 is a diagram 600 illustrating components of a sensor node, according to some embodiments. The view 600 illustrates the port 254, the housing 302, the sensors 204, 206, 256 on the PCB 304, a cable 602 from the PCB 304 to the microphone 208, the brackets 254, the base 306, the spring 207, the O-ring 250(1), and the material 250(2).

Figure 7:
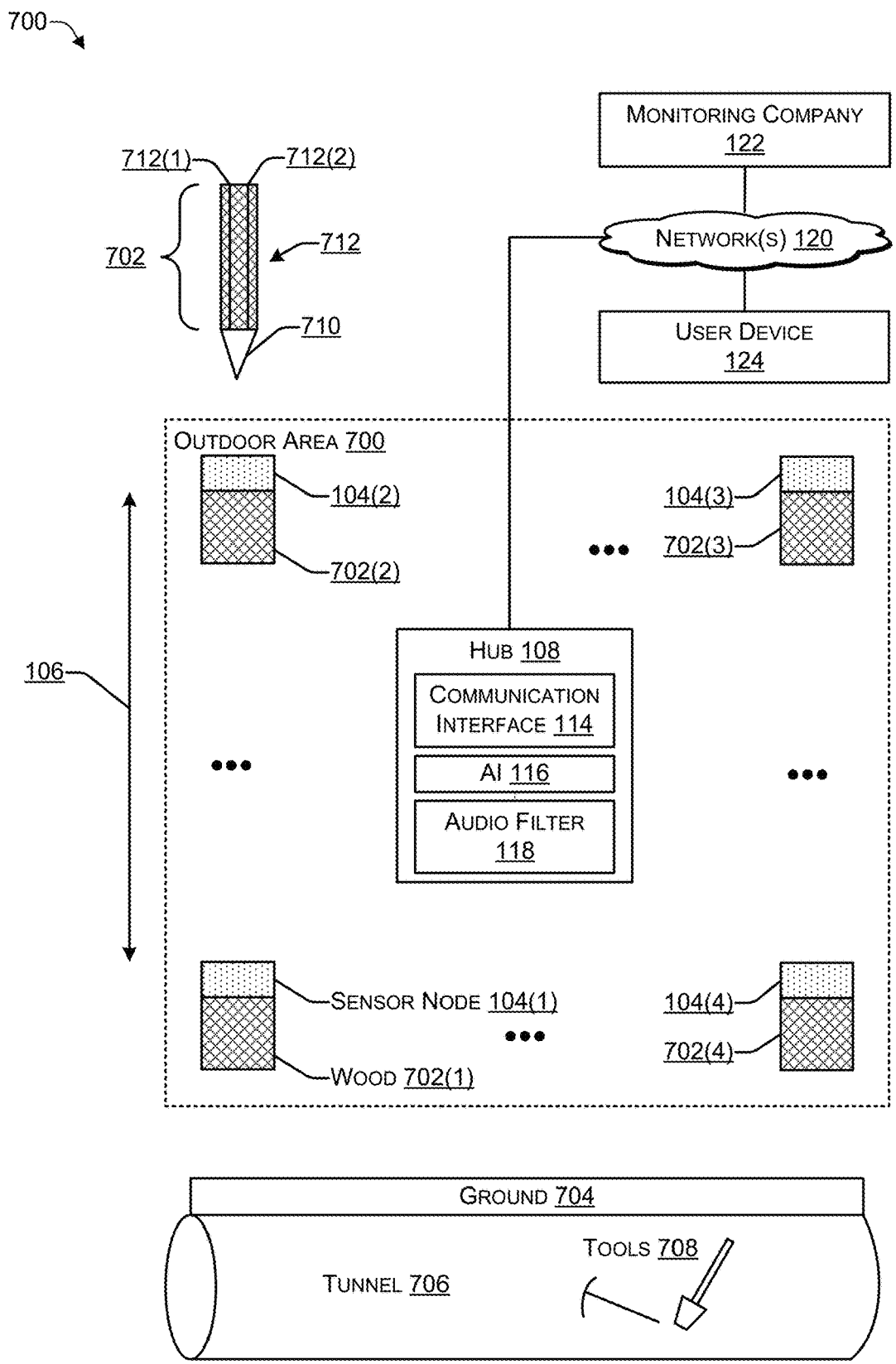
FIG. 7 illustrates deploying multiple sensor nodes in an outdoor area, according to some embodiments.

FIG. 7 is a diagram illustrating multiple sensor nodes deployed in an outdoor area 700, according to some embodiments. The outdoor area 700, such as a yard, a park, a forest, or another type of outdoor area, may be protected from pests, such as wood-boring pests and/or other types of pests, by deploying multiple representative sensor nodes 104(1), 104(2), 104(3), 104(4) on corresponding multiple wood posts 702(1), 702(2), 702(3), 702(4). The sensor nodes 104 may be deployed in the outdoor area 702 in such a manner as to provide near 100% coverage of the outdoor area 700. The sensor nodes 104 may be no more than the distance 106 from at least one neighboring sensor node to enable daisy chain messaging, as described above. While four wood posts 702 are shown in FIG. 7, any number of wood posts 702 sufficient to cover the outdoor area 700 may be used and they may be arranged to provide pest-detection coverage for the outdoor area 700 based on the size and shape of the outdoor area 700. In some cases, at least some of the wood posts 702 may be part of a fence or other wood-based structure.

One or more hubs 108 may be deployed in the outdoor area 700 based on a size and shape of the outdoor area 700, how many of the sensor nodes 702 are deployed in the outdoor area 700, and any other relevant factors. The hubs 108 may be mounted on wood posts 702 or other structures within the outdoor area 700. For example, in some cases, the hubs 108 may be located at the top of wood posts, metal posts, plastic posts, or may be buried underground.

Individual wood posts 702 may include a tapered (pointed) tip 710 to enable each wood post 702 to be easily inserted into the ground. A cylindrical body 712 of the wood post 702 may include multiple grooves 712(1), 712(2) to enable wood-boring pests to easily travel along a side of each wood post 702. In some cases, the wood posts 702 may be made from or include an attractant, such as rubber wood (e.g., the wood of a rubber tree). Wood boring pests, such as termites, thrive in specific environmental conditions. The sensor nodes 104 and/or the hubs 108 may be programmed to compare currently measured soil conditions (e.g., temperature level and humidity level) with a specific set of soil conditions known to be conducive to a particular type of wood boring pest, such as termites. Understanding these conditions aids in accurately identifying and responding to potential termite infestations in the area 700. Termites are ectothermic, meaning their activity is heavily influenced by external temperatures. Soil temperatures between 20° Celsius (C) and 30° C. provide an ideal environment for termites. Below 20° C., the metabolic processes of the termites slow down, reducing activity. Above 30° C., the heat can be detrimental to the survival and activities of termites. Wood boring pests, such as termites, prefer a certain level of moisture to survive and maintain their colonies. For example, for termites, a soil humidity of between about 20% to about 60% offers sufficient moisture for termites to sustain themselves without being too wet. A soil humidity greater than 60% could lead to fungal growth that is harmful to the colony. A soil humidity less than 20% is too dry and could desiccate the termites. Outdoor air temperature affects the microclimate within and around termite nests. Ambient (above ground) temperatures between about 25° C. and about 35° C. are conducive to termite activities, such as foraging and building. This range supports the thermal requirements for termites' physiological and reproductive processes. Termites prefer ambient (above ground) humidity levels of between about 50% to about 70%. High outdoor humidity levels contribute to the overall moisture content in the environment, reducing the risk of desiccation for termites. Humidity levels between 50% and 70% help maintain the moisture levels in termite habitats and facilitate their above ground activities, such as foraging. In some cases, soil pH may affect the foraging behavior of termites. For example, termites exhibit the highest activity levels in soils with pH values ranging from about 5.5 to about 7.0.

In some cases, one or more of the sensor nodes 104 deployed in the outdoor area 700 may be configured to detect vibrations caused by activities performed below ground 704. For example, the sensor nodes 104 may be configured to detect vibrations caused by tools 708 (automated and/or human-usable tools) used to create a below ground 704 tunnel 706 or vibrations caused by other activities (e.g., transportation of goods and/or humans) through the tunnel 706. To illustrate, the sensor nodes 104 may be used to monitor sensitive areas, such as a border area between two countries, an area around a military base, or other such areas. The sensor nodes 104 may monitor such areas to detect below ground 704 activities, such as smuggling of drugs, weapons, explosives, or other types of contraband.

Figure 8A:
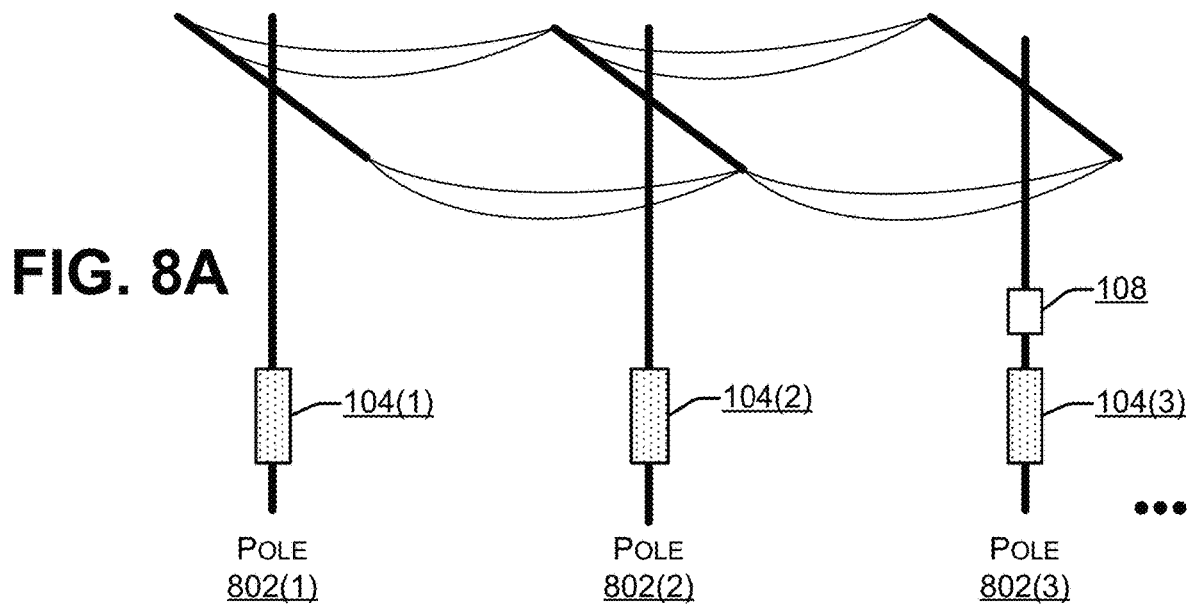
FIGS. 8A, 8B, and 8C illustrate different applications of sensor nodes, according to some embodiments.
Figure 8B:
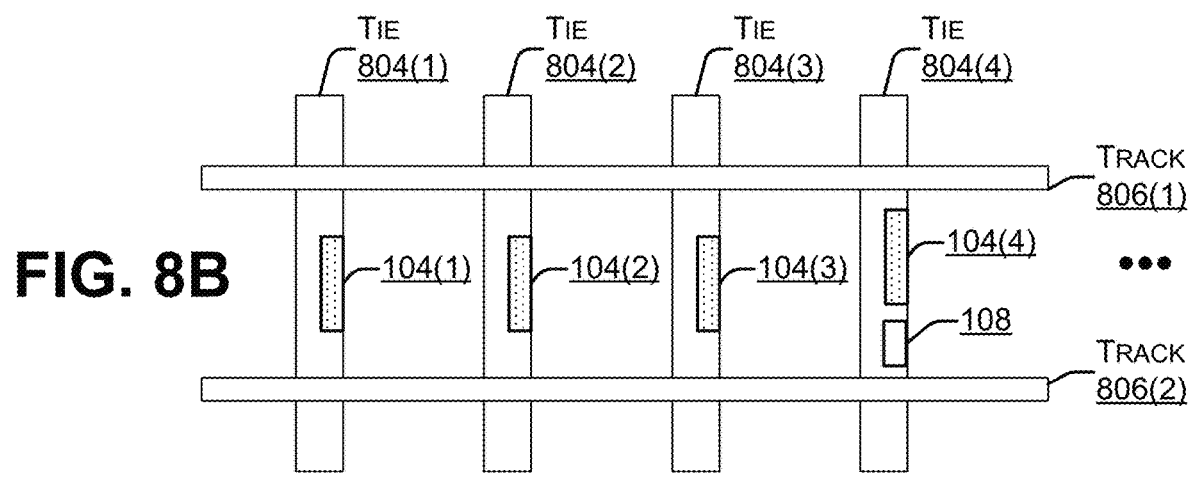
Figure 8C:
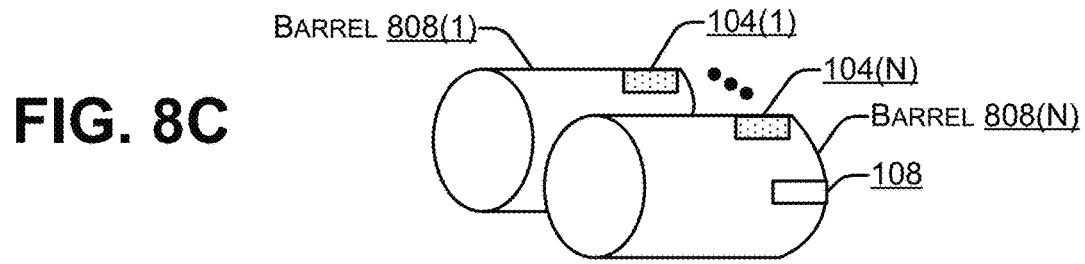

FIGS. 8A, 8B, and 8C illustrate different applications of sensor nodes, according to some embodiments. FIG. 8A illustrates multiple sensor nodes 104 deployed on utility poles 802(1), 802(2), 802(3) used to carry telecommunication signals, data signals, power (e.g., electrical) lines, or the like. Each utility pole 802 may be expensive to deploy and therefore the sensor nodes 104 may be used to detect and prevent wood-boring pests from damaging the utility poles 802. Multiple hubs may be deployed, with individual hubs, such as the representative hub 108 monitoring multiple sensor nodes, such as the sensor nodes 104(1), 104(2), 104(3). While the hub 108 is shown as being attached to one of the utility poles 802, the hub 108 may mounted somewhere other than the utility poles 802, such as being buried underground, or the like. In this application, the sensor nodes 104(1), 104(2), 104(3) may include a tilt sensor to detect an angle of the corresponding utility poles 802(1), 802(2), 802(3) relative to the ground. For utility poles, such as 802(1), 802(2), 802(3), an acceptable lean is 0-2 degrees from vertical. When strong winds are present, utility poles may sway 2-5 degrees. For example, when the tilt sensors in the sensor nodes 104 detect a tilt of 0-2 degrees, the sensor nodes and/or the hub 108 may consider this to be normal. When the tilt sensors in the sensor nodes 104 detect a tilt of 2-5 degrees, the sensor nodes 104 and/or the hub 108 may send a warning notification. To account for temporary swaying caused by wind, the sensor nodes 104 may determine whether the tilt of between about 2 degrees to about 5 degrees is present for more than a predetermined amount of time or present in more than X (X>0) number of consecutive measurements. For example, if the tilt is between about 2 to about 5 degrees for at least an hour or for at least 4 consecutive measurements taken 15 minutes apart, then the hub 108 may send a warning notification. When the tilt sensors in the sensor nodes 104 detect a tilt of greater than about 5 degrees, the sensor nodes 104 and/or the hub 108 may send a critical alert notification. The time interval at which the sensor nodes 104 transition from the sleep mode to the low power mode or active mode to take measurements (e.g., to measure tilt, temperature, humidity, wood moisture level, or any combination thereof) may vary based on weather, sustained angle, and by region.

FIG. 8B illustrates multiple sensor nodes 104 deployed on railway ties 804(1), 804(2), 804(3), 804(4) on railway tracks 806(1), 806(2). Each tie 804 may be expensive to deploy and therefore the sensor nodes 104 may be used to detect and prevent wood-boring pests from damaging the ties 804. Multiple hubs may be deployed, with individual hubs, such as the representative hub 108 monitoring multiple sensor nodes, such as the sensor nodes 104(1), 104(2), 104(3), 104(4). While the hub 108 is shown as being attached to one of the ties 804, the hub 108 may mounted somewhere other than the ties 804, such as being buried underground, mounted on a pole, or the like.

FIG. 8C illustrates multiple sensor nodes 104 deployed on barrels 808(1) to 808(N) (N>0). Each barrel 808 may be expensive to deploy and therefore the sensor nodes 104 may be used to detect and prevent wood-boring pests from damaging the barrels 808. For example, the barrels 808 may be used to age vinegar, alcohol (e.g., wine, beer, whiskey, bourbon, and the like), cheese, or other consumables. Multiple hubs may be deployed, with individual hubs, such as the representative hub 108 monitoring multiple sensor nodes, such as the sensor nodes 104(1) to 104(N). While the hub 108 is shown as being attached to one of the barrels 808, the hub 108 may mounted somewhere other than the barrels 808, such as mounted on a wall, or the like. While barrels 808 are shown for illustration purposes, the wooden items 808 may include antique wood items, wood-based museum pieces, or other valuable wood-based objects.

Figure 9:
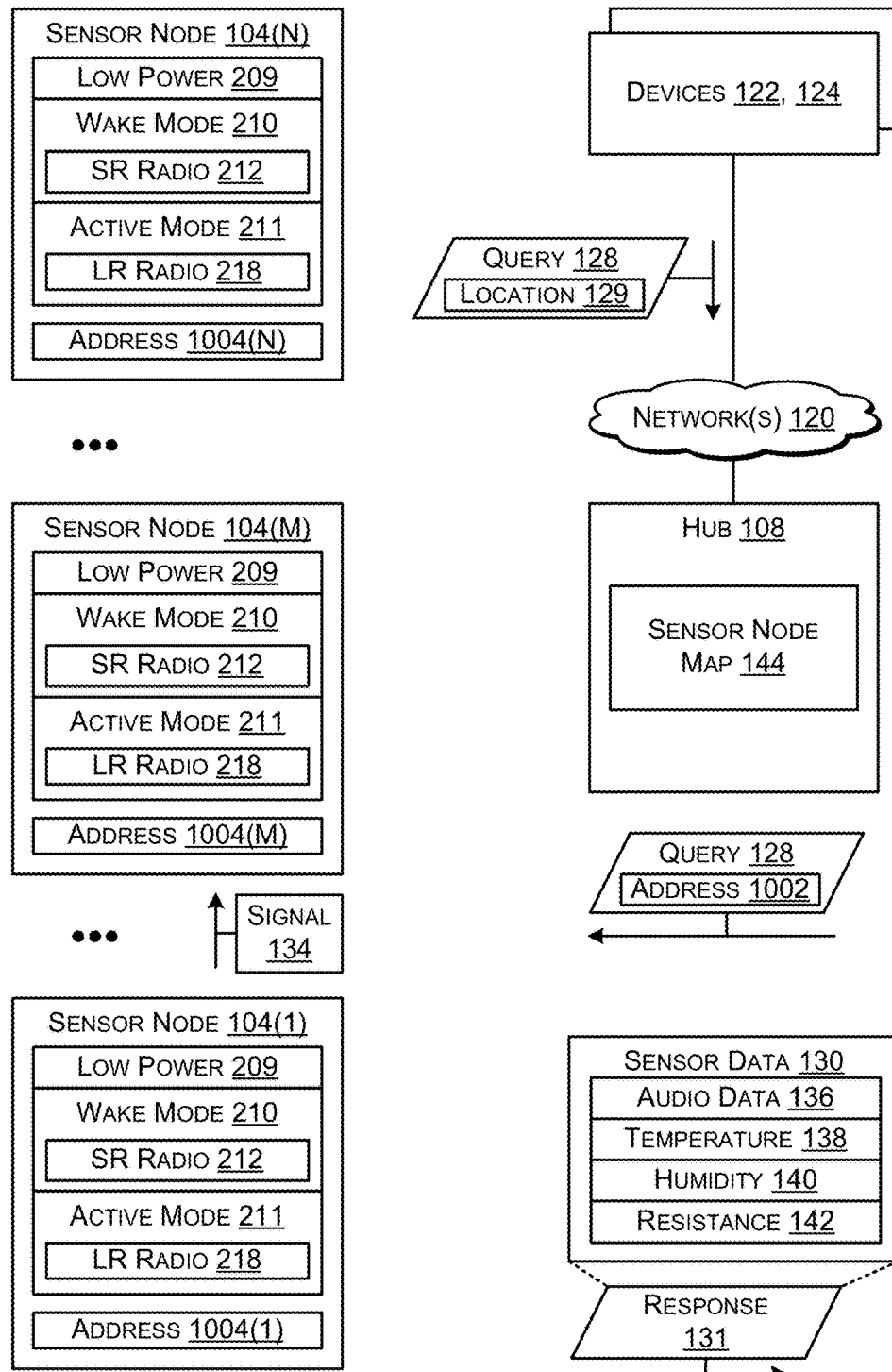
FIG. 9 is a system diagram illustrating daisy-chaining a message to a destination sensor node, according to some embodiments.

FIG. 9 illustrates a system 900 in which a message is daisy-chained to a destination sensor node, according to some embodiments. One of the devices 122, 124 may send the query 128 that specifies the location 129. For example, the query 128 may request information about a status of the location 129, such as whether pest activity has been detected near the location 129, whether a potential moisture leak has been detected near the location 129, or both. To illustrate, a homeowner or a maintenance person may hear a noise in the walls at a particular location and send the query 128 to determine additional information regarding the noise.

The hub 108 may receive the query 128 and send the query 128 to one or more of the sensor nodes 104. In some cases, the hub 108 may include the location 129 in the query 128 while in other cases the hub 108 may translate the location 129 into a specific address 1002 associated with a particular one of the sensor nodes 104 and include the specific address 1002 in the query 128. In some cases, the query 128 may include both the location 129 and the address 100 to one another cases the query 128 may include one but not the other. For example, the location 129 may specify a location in broad terms, such as an attic of a house, and upstairs north wall, or the like. In this example, the hub 108 may translate the location 129 to a unique address, such as a device serial number, a media access control (MAC) address, an Internet protocol (IP) address, or another type of address. If the hub 108 has mapped out the sensor nodes 104 to create the sensor node map 144, then the hub 108 may determine a shortest path for the query 128 to reach the sensor node 104 identified in the query 128 with the address 1002. In such cases, the hub 108 may include the path in the query 128. For example, the hub 108 may specify multiple addresses in the address field 1002 where the multiple addresses specify the path to the sensor node addressed by the query 128. If the hub 108 has not created the sensor node map 144, then the hub 108 may broadcast the query 128 with the address 1002.

Assume that the sensor node 104(1) is nearest to the hub 108 and receives the query 128. The sensor node 104(1) may transition from the low-power mode 209 to the wake mode 210 and determine whether the address 1002 in the query 128 is equivalent to the address 1004(1) associated with the sensor node 104(1). If the sensor node 104(1) determines that the address 1002 in the query 128 is different from the address 1004(1), then the sensor node 104(1) may send (or broadcast) the signal 134 to a next sensor node, such as the sensor node 104(M), using the short range radio 212. In this way, the signal 134 may be used to relay the query 128 to the next sensor node. After sending the signal 134 to the next sensor node, the sensor node 104(1) may transition from the wake mode 210 back to the low-power mode 209 to conserve power.

The next sensor node, such as the sensor node 104(M) received the query 128. The sensor node 104(M) may transition from the low-power mode 209 to the wake mode 210 and determine whether the address 1002 in the query 128 is equivalent to the address 1004(M) associated with the sensor node 104(M). If the sensor node 104(M) determines that the address 1002 in the query 128 is equivalent to the address 1004(M), indicating that the query 120 is addressed to the sensor node 104(M), then the sensor node 104(M) may transition from the wake mode 210 to the active mode 211 and initiate direct communications with the hub 108 using the long range radio 218. For example, the communications between the sensor node 104(M) and the hub 108 may include the sensor node 104(M) sending at least a portion of the sensor data 130 in the response 131. The portion of the sensor data 130 included in the response 131 may be selected to address the query 128. After the sensor node 104(M) has completed communicating with the hub 108, the sensor node 104(M) may transition from the active mode 211 back to the low-power mode 209 to conserve power.

In this way, multiple sensor nodes may relay (e.g., via a daisy chain) a query addressed to a particular sensor node using a short range radio in a wake mode that uses significantly less power compared to using a long range radio in an active mode, thus reducing power consumption. When the particular sensor addressed by the query receives the query, the particular sensor transitions to the active mode and initiates communications directly with a hub using a long-range radio. In some cases, the sensor nodes that relay the query may be those that have a battery level greater than a threshold amount while sensor nodes with a relatively low battery level may remain in the low-power mode and not transition to the wake mode 210. In this way, sensor nodes with relatively low battery levels may conserve power and may not further deplete the batteries.

Figure 10:
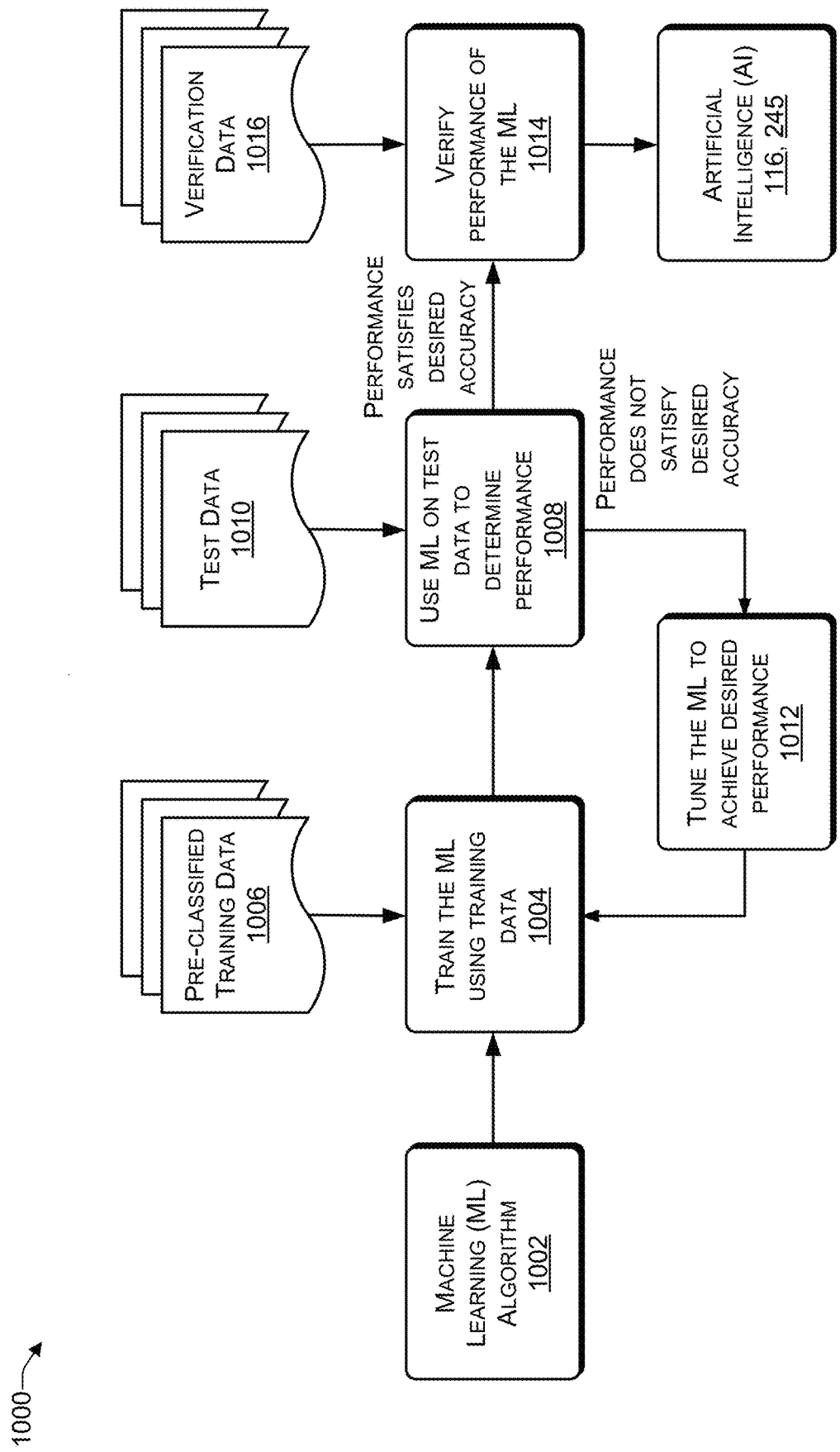
FIG. 10 is a flowchart of a process to train a machine learning algorithm to create an artificial intelligence (AI), according to some embodiments.

FIG. 10 is a flowchart of a process 1000 to train a machine learning algorithm, according to some implementations. For example, the process 1000 may be performed to train and create the AI 116, the AI 245, or the like. The AI 116, AI 245 may include artificial neural networks, reinforcement learning, classifiers (e.g., support vector machine), deep learning, generative pre-trained transformers, or other types of AI.

At 1002, a machine learning algorithm (e.g., software code) may be created by one or more software designers. For example, the AI 116, AI 245 may be created by software designers. At 1004, the machine learning algorithm may be trained using pre-classified training data 1006. For example, the training data 1006 may have been pre-classified by humans, by machine learning, or a combination of both. After the machine learning has been trained using the pre-classified training data 1006, the machine learning may be tested, at 1008, using test data 1010 to determine a performance metric of the machine learning. The performance metric may include, for example, precision, recall, Frechet Inception Distance (FID), or a more complex performance metric. For example, in the case of a classifier, the accuracy of the classification may be determined using the test data 1010.

If the performance metric of the machine learning does not satisfy a desired measurement (e.g., 95%, 98%, 99% in the case of accuracy), at 1008, then the machine learning code may be tuned, at 1012, to achieve the desired performance measurement. For example, at 1012, the software designers may modify the machine learning software code to improve the performance of the machine learning algorithm. After the machine learning has been tuned, at 1012, the machine learning may be retrained, at 1004, using the pre-classified training data 1006. In this way, 1004, 1008, 1012 may be repeated until the performance of the machine learning is able to satisfy the desired performance metric. For example, in the case of a classifier, the classifier may be tuned to be able to classify the test data 1010 with the desired accuracy.

After determining, at 1008, that the performance of the machine learning satisfies the desired performance metric, the process may proceed to 1014, where verification data 1016 may be used to verify the performance of the machine learning. After the performance of the machine learning is verified, at 1014, the machine learning 1002, which has been trained to provide a particular level of performance may be used as the AI 116, AI 245, or another AI described herein.

Figure 11:
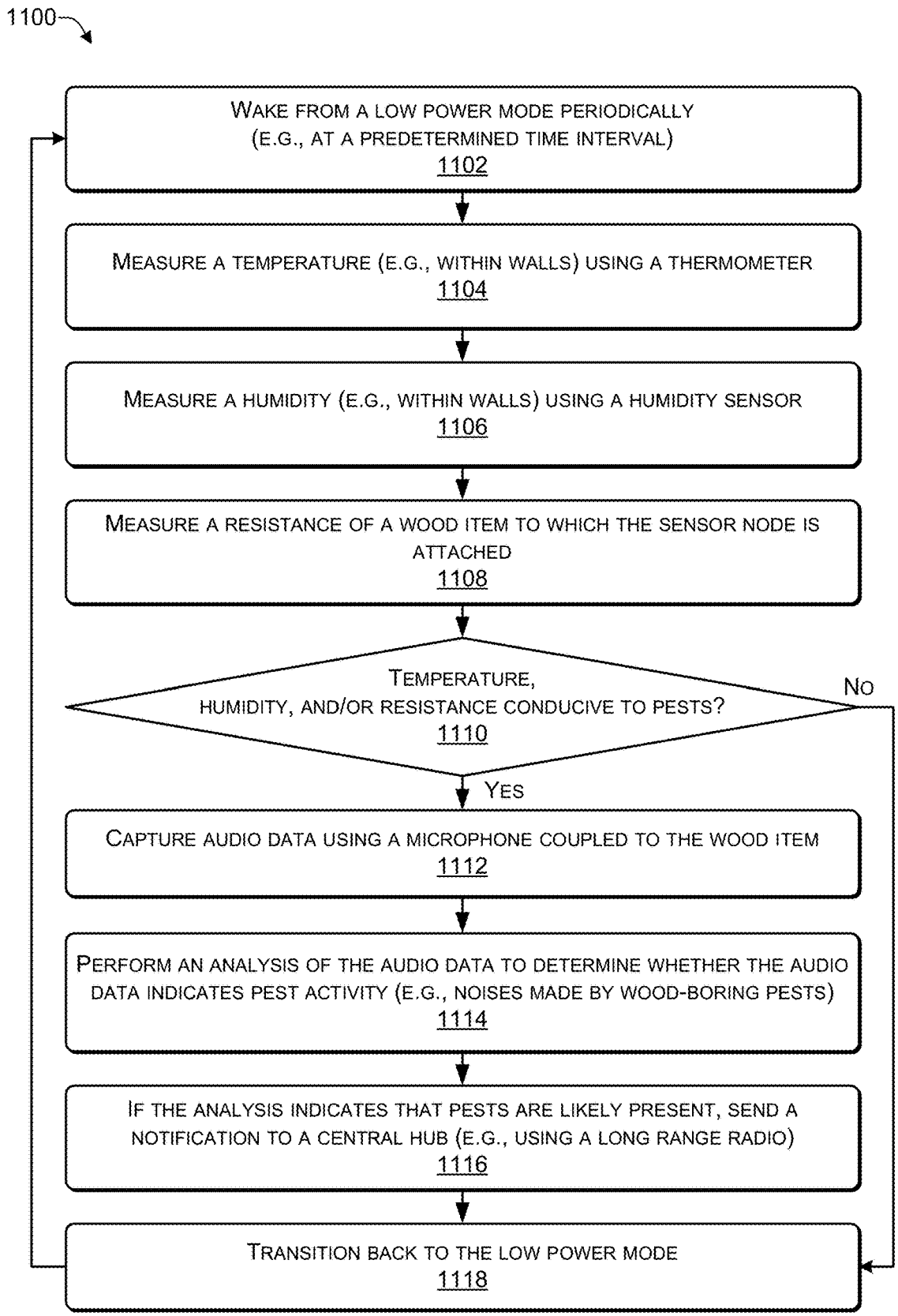
FIG. 11 is a flowchart of a process to periodically determine whether conditions are conducive for pests, according to some embodiments.

FIG. 11 is a flowchart of a process 1100 to periodically determine whether conditions are conducive for pests, according to some embodiments. The process 1100 may be performed by a sensor node, such as one of the sensor nodes 104 of FIG. 1, 2, 3, 4, 5, 6, 7, 8, or 9.

At 1102, the process may periodically (e.g., at a predetermined time interval) wake from a dormant mode. At 1104, the process may measure a temperature using a thermometer. At 1106, the process may measure a humidity using a humidity sensor. At 1108, the process may measure a resistance of a wood item to which the sensor node is attached (the resistance is used to determine an amount of moisture present in the wood). For example, in FIG. 2, the sensor node 104 may periodically (e.g., at a predetermined time interval) wake from the low-power mode 209, e.g., by transitioning from the low-power mode 209 to the wake mode 210. In the wake mode 210, the sensor node 104 may use the temperature sensor 204 to determine the current temperature 230 (e.g., an ambient temperature external to the sensor node 104, such as between the walls of a building) via the port 254. In the wake mode 210, the sensor node 104 may use the humidity sensor 206 to determine the current humidity 224 (e.g., an ambient humidity external to the sensor node 104, such as between the walls of a building) via the port 254. In the wake mode 210, the sensor node 104 may use the wood resistance sensor 256 to determine the current resistance 258 of the wood 102 approximately between the fastener 248(1) and the fastener 248(2).

At 1110, the process determines whether the temperature, humidity, resistance, or any combination thereof indicate conditions that are conducive to pests. If the process determines, at 1110, that "no" the conditions (temperature, humidity, resistance, or any combination thereof) are unconducive to pests, then the process may proceed to 1118, and transition back to the dormant mode. If the process determines, at 1110, that "yes" the conditions (temperature, humidity, resistance, or any combination thereof) are conducive to pests, then the process may proceed to 1112. At 1112, the process may capture audio data using a microphone that is closely coupled to the wood item. At 1114, the process may perform an analysis of the audio data to determine whether the audio data indicates pest activity (e.g., noises made by wood boring pests or other types of pests). For example, in FIG. 2, the sensor node 104 may determine whether the current conditions, such as the current temperature 230, the current humidity 224, and/or the current resistance 258 (indicative of an amount of moisture in the wood 102), are suitable (conducive) to particular types of pests, such as wood-boring pest (e.g., termites). If the sensor node 104 determines that the current conditions are conducive to particular types of pests, then the sensor node 104 may use the microphone 208 to capture current audio data 236. The sensor node 104 may perform an analysis (including filtering) of the audio data 236 to determine whether the audio data indicates pest activity. For example, the microphone 208 may capture audio data at a sampling rate of 96 KHz. To detect termites, the audio processing 246 may filter the audio data to keep audio data in the 10 kHz to 40 kHz while filtering out frequencies below 10 kHz and frequencies above 40 kHz. Of course, other frequencies may be used for filtering to detect other types of pests. In some cases, the audio processing 246 may perform additional processing (e.g., compression, down-sampling, or the like) to reduce a size of the audio data prior to transmission to reduce a size of the payload being transmitted.

At 1116, if the analysis indicates that pests are likely present, then the process may send the notification to a central hub (e.g. using a long-range radio). At 1118, the process may transition back to the dormant mode and, after the predetermined time interval, wake from the dormant mode, at 1102. For example, in FIG. 2, if the sensor node 104 determines that the current audio data 236 indicates the likely presence of pests, then the sensor node may transition to the active mode 211 and use the long range radio 218 to transmit a pest presence notification, including at least a portion of the audio data, to the hub 108.

Thus, multiple sensor nodes may be deployed on wood items, such as wood beams in a building, telephone poles, railway ties, aging barrels, or other valuable wood items. Each sensor node may periodically wake from a dormant mode and measure environmental conditions, such as, for example a temperature, a humidity, a wood resistance, or the like. If the sensor node determines that the environmental conditions are likely conducive to pests, then the sensor node may capture audio data using a microphone that is coupled to the wood item and analyze the audio data to determine if the audio data is indicative of pest activity. If the audio data is indicative of pest activity, then the sensor node may transition to an active mode and use a long-range radio to transmit a pest presence notification to a hub. In some cases, the pest presence notification may include at least a portion of the audio data (e.g., in a compressed form). In this way, the multiple sensor nodes may be used to detect pest activity in wood items early on, thereby enabling remediation measures to be taken to limit the amount of damage caused by the pest activity.

Figure 12:
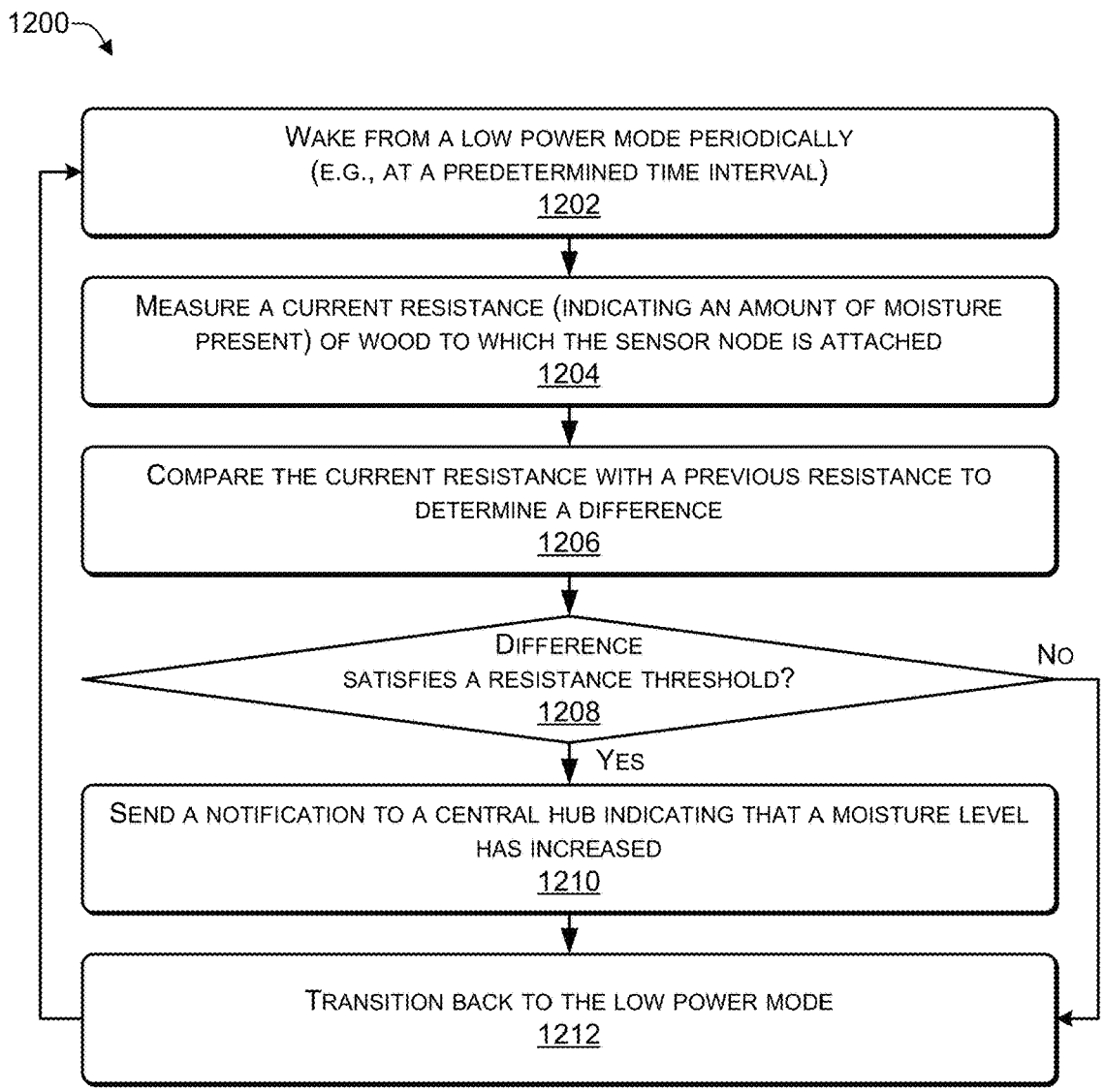
FIG. 12 is a flowchart of a process to periodically determine whether conditions indicate increased moisture levels, according to some embodiments.

FIG. 12 is a flowchart of a process 1200 to periodically determine whether environmental conditions indicate increased moisture levels, according to some embodiments. The process 1200 may be performed by a sensor node, such as one of the sensor nodes 104 of FIG. 1, 2, 3, 4, 5, 6, 7, 8, or 9. For example, the process 1200 may be used by the sensor nodes 104 to detect the presence of moisture indicative of a leaky pipe, leaky roof, or other leak in a building, such as a house or commercial structure. It should be understood that the process 1100 and the process 1200 may, in some cases, be combined into a single process that checks for the presence of both pests and leaks. The two processes have been separately described purely for ease of understanding.

At 1202, the process may wake from a dormant mode periodically (e.g., at a predetermined time interval). At 1204, the process may measure a current resistance (indicating an amount of moisture present) of wood to which the sensor node is attached. At 1206, the process may compare the current resistance with the previous resistance to determine a difference. At 1208, the process determines whether the difference satisfies a resistance threshold. If the process determines, at 1208, that "yes" the difference satisfies the resistance threshold, then the process may send a notification to a central hub indicating that a moisture level has increased (indicating a possible leak), and proceed to 1212. If the process determines, at 1208, that "no" the difference fails to satisfy the resistance threshold, then the process proceeds to 1212, where the sensor node transitions back to the dormant mode, and then waits for the predetermined time interval before waking from the dormant mode, at 1202.

Figure 13:
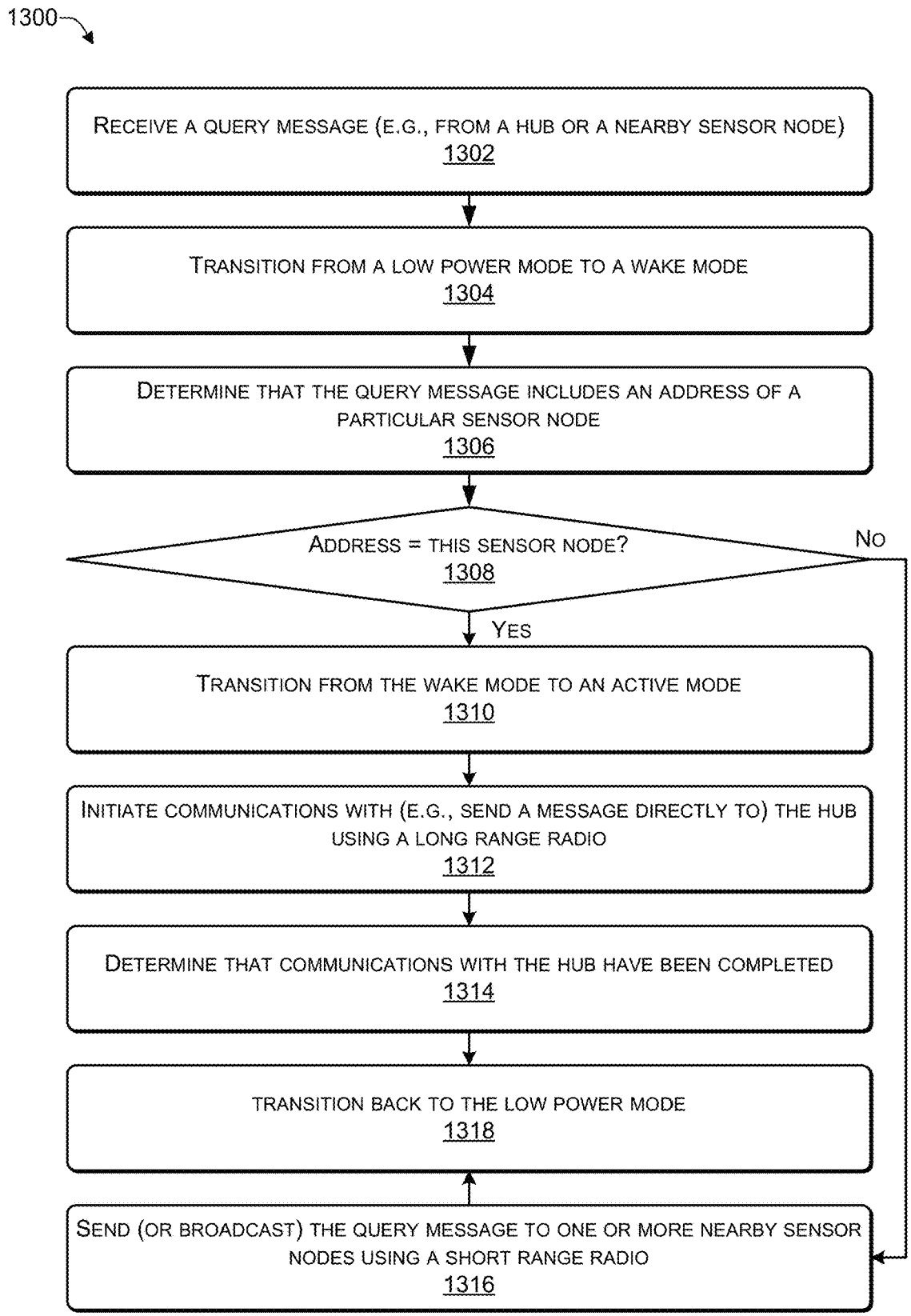
FIG. 13 is a flowchart of a process to relay a query message, according to some embodiments.

FIG. 13 is a flowchart of a process 1300 to receive a query message, according to some embodiments. The process 1300 may be performed by a sensor node, such as one of the sensor nodes 104 of FIG. 1, 2, 3, 4, 5, 6, 7, 8, or 9.

At 1302, the process may receive a query message (e.g., from a hub or a nearby sensor node). At 1304, the process may transition from a dormant mode to a wake mode. At 1306, the process may determine that the query message includes an address of a particular sensor node. The process may determine, at 1308, whether the address is of this sensor node, e.g. the address of the sensor node that received the query message. If the process determines, at 1308, that "no" the address is not this sensor node's address, then the process proceeds to 1316. At 1316, the process may send (or broadcast) the query message to one or more nearby sensor nodes using a short-range radio. In this way, the query message may be relayed via a daisy chain to the node addressed by the query message. If the process determines, at 1308, that "yes" the address is this sensor node's address, then the process proceeds to 1310. For example, in FIG. 1, the sensor node 104(1) may receive the query 128 (e.g., from the hub 108 or a nearby sensor node 104). The sensor node 104(1) may transition from the low power mode 209 to the wake mode 210 of FIG. 2. The sensor node 104(1) may determine that the query 128 includes the location 129 of a particular sensor node 104. The sensor node 104(1) may determine whether the location 129 is of this sensor node, e.g. the sensor node 104(1). If the sensor node 104(1) determines that the location 129 is not the address of the sensor node 104(1), then the sensor node 104(1) may send (or broadcast) the query 128 to one or more nearby sensor nodes 104 using the short range radio 212 of FIG. 2. In this way, the query 128 may be relayed via a daisy chain to the node with the location 129 in the query 128.

At 1310, the process may transition from the wake mode to an active mode. At 1312, the process may initiate communications with (e.g., send the message directly to) the hub using a long-range radio. At 1314, the process may determine that communications with the hub have been completed. After determining that the communications with the hub have been completed, at 1314, the process may proceed to 1318 and transition back to the dormant mode. For example, in FIG. 1 and FIG. 2, if the location 129 in the query 128 is associated with the sensor node 104(1), then the sensor node 104(1) may transition from the wake mode 210 to the active mode 211. The sensor node 104 may initiate communications with (e.g., send messages directly to) the hub 108 using a long range radio 218. After the sensor node 104 has completed communicating with the hub 108, the sensor node 104 may determine that communications with the hub 108 have been completed. In response, the sensor node 104 may transition back to the low power mode 209.

Thus, a hub may send (or broadcast) a query message addressed to a particular sensor node. A sensor node that is nearby the hub may receive the query message and determine whether the query message is addressed to that sensor node. If the query message is not addressed to that sensor node (that received the query message), then the sensor node may send (or broadcast) the query message to one or more nearby sensor nodes using a short range radio in a low-power mode. If the query message is addressed to that sensor node, then the sensor node may transition from the low-power mode to an active mode and initiate communications directly with the hub using a long-range radio. After the sensor node has completed communicating with the hub, the sensor node may transition back to the low-power mode. In some cases, the sensor nodes with relatively high amounts of battery power may participate in relaying the query message while sensor nodes with a relatively low amount of battery power may not participate in relaying the query message to conserve battery power.

Figure 14:
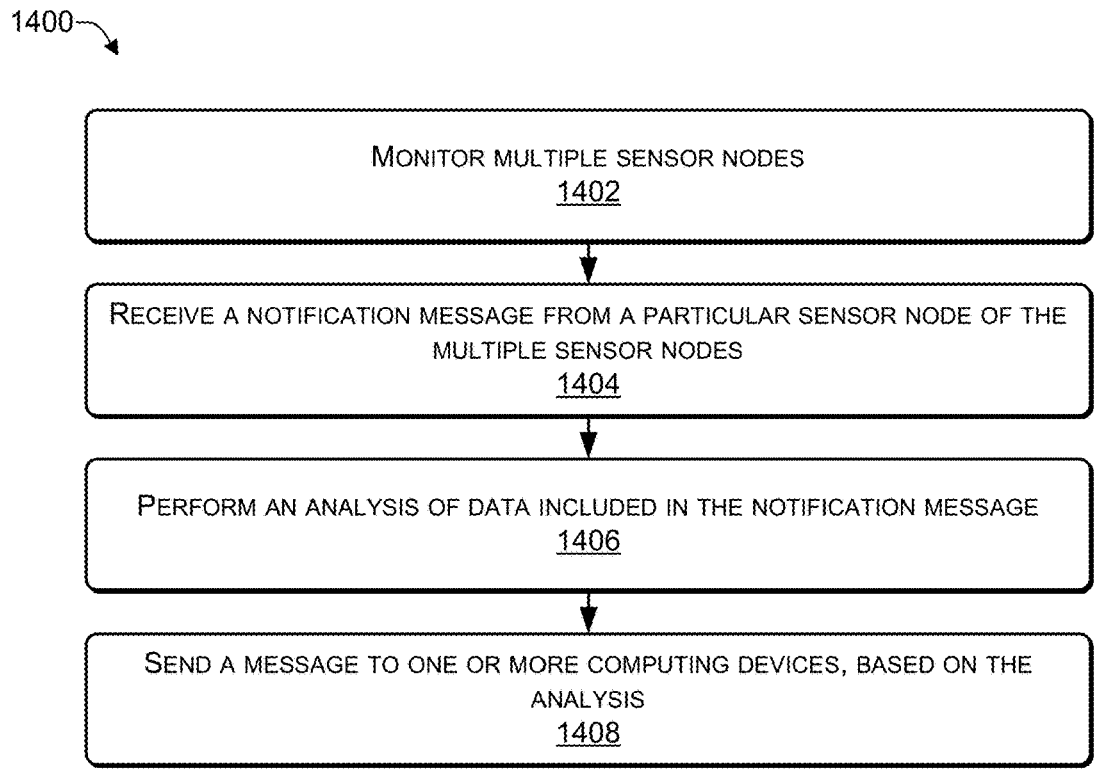
FIG. 14 is a flowchart of a process to receive a notification from a sensor node, according to some embodiments.

FIG. 14 is a flowchart of a process 1400 to receive a notification from a sensor node, according to some embodiments. The process 1400 may be performed by a hub, such as the hub 108 of FIG. 1, 2, 7, 8, or 9.

At 1402, the process may monitor multiple sensor nodes. At 1404, the process may receive a notification message from a particular sensor node of the multiple sensor nodes. At 1406, the process may perform an analysis of data included in the notification message. At 1408, the process may send a message to one or more computing devices, based on the analysis. For example, in FIG. 1, the hub 108 may monitor the multiple sensor nodes 104. The hub 108 may receive the notification 126 from one of the sensor nodes 104 that has detected a pest activity, determine that a moisture level has increased (indicating a possible leak), or detected another noteworthy condition. In some cases, the notification 126 may include at least a portion of the sensor data 130, such as the audio data 136, the temperature 138, the humidity 140, the wood resistance 142, or any combination thereof. The hub 108 may perform an analysis of the portion of the sensor data 130 included in the notification 126 and if warranted, based on the analysis, the hub 108 may send the notification 126 to a computing device associated with the monitoring company 122, to the server 123, to the user device 124, or any combination thereof. In this way, a user may receive the notification 126 and take appropriate action, such as checking into possible pest activity, checking into whether a leak has occurred, or the like.

Thus, a hub may monitor multiple sensor nodes. When the hub receives the notification message from a particular sensor node, the hub may perform an analysis of data included in the notification message to determine what the data indicates. The hub may send a message to one or more computing devices based on the analysis. For example, the message may indicate that (1) pest activity has been detected in a particular area of a building, (2) indications of a leak have been detected in a particular area of the building, or the like. In this way, a user may receive the message and take one or more actions to remediate the issue, such as by calling a pest control company to address pest activity or a plumber to address the leak.

Figure 15:
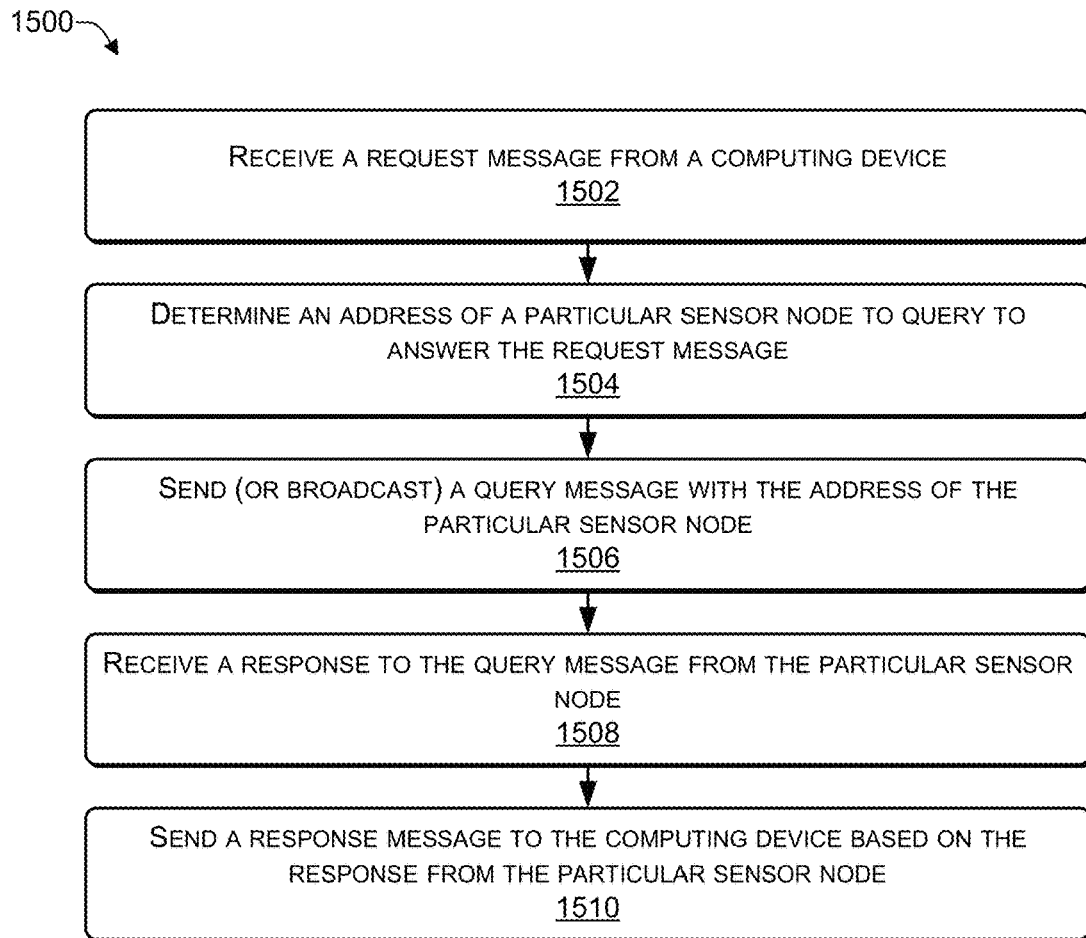
FIG. 15 is a flowchart of a process to receive a request from a computing device, according to some embodiments.

FIG. 15 is a flowchart of a process 1500 to receive a request from a computing device, according to some embodiments. The process 1500 may be performed by a hub, such as the hub 108 of FIG. 1, 2, 7, 8, or 9.

At 1502, the process may receive a request message from a computing device. At 1504, the process may determine an address of a particular sensor node to query to answer the request message. At 1506, the process may send (or broadcast) a query message with the address of the particular sensor node. At 1508, the process may receive a response to the query message from the particular sensor node. At 1510, the process may send the response message to the computing device based on the response from the particular sensor node. For example, in FIG. 1, a user associated with one of the computing devices 122 or 124 may send the query 128 asking a status of a particular area in a building. The hub 108 may identify one or more sensor nodes located in or near the particular area and send the query 128 addressed to the one or more sensor nodes. After receiving a response from the one or more sensor nodes in the particular area in the building, the hub 108 may send the response to the query 128 indicating the status of the particular area in the building. In this way, a user can remotely check on the status of a particular location, such as a particular area in a building, and take appropriate action.

The example systems and devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving, by one or more processors of a central hub and from a sensor node that is mounted to a wood item inside a wall of a building, a notification including sensor data comprising:
        an ambient temperature inside the wall of the building;
        an ambient humidity inside the wall of the building;
        a resistance of the wood item between two metal fasteners used to fasten the sensor node to the wood item; and
        audio data captured by a microphone of the sensor node that is coupled to the wood item;
    performing an analysis, by an artificial intelligence algorithm executed by the one or more processors, of the sensor data;
    determining, by the one or more processors and based on the analysis, a presence of a pest in the wood item; and
    sending, by the one or more processors, a message indicating the presence of the pest to a computing device.

2. The method of claim 1, wherein the computing device is associated with:
    an occupant of the building; or
    a service provider providing a pest monitoring service.

3. The method of claim 1, wherein the wood item comprises:
    a wood stud that is a part of a structure of the building.

4. The method of claim 1, wherein:
    the artificial intelligence algorithm comprises a convolutional neural network trained to detect at least one type of wood-boring pest.

5. The method of claim 1, further comprising:
    filtering the audio data using an audio filter to retain ultrasonic frequencies between about 20 kilohertz to about 40 kilohertz before performing the analysis.

6. The method of claim 1, wherein performing the analysis comprises:
    determining that the ambient temperature is at least 65 degrees fahrenheit;
    determining, based on the resistance of the wood item, that a moisture content of the wood item is at least 15 percent; and
    determining that the ambient humidity is at least 50 percent.

7. The method of claim 5, wherein:
    the audio filter uses a sampling frequency of between 80 kilohertz and 96 kilohertz.

8. A central hub comprising:
    one or more processors; and
    one or more non-transitory computer readable media storing instructions executable by the one or more processors to perform operations comprising:
        receiving, by a central hub and from a sensor node that is mounted to a wood item inside a wall of a building, a notification including sensor data comprising:
            an ambient temperature inside the wall of the building;
            an ambient humidity inside the wall of the building;
            a resistance of the wood item between two metal fasteners used to fasten the sensor node to the wood item; and
            audio data captured by a microphone of the sensor node that is coupled to the wood item;
        performing an analysis, by an artificial intelligence algorithm executed by the one or more processors, of the sensor data;
        determining, by the one or more processors and based on the analysis, a presence of a pest in the wood item; and
        sending, by the one or more processors, a message indicating the presence of the pest to a computing device.

9. The central hub of claim 8, wherein:
    the message includes an indication that termite activity is detected in an ultrasonic frequency range of the audio data.

10. The central hub of claim 8, wherein the pest comprises at least one of:
    carpenter ants,
    termites,
    wood-boring beetles,
    carpenter bees,
    wood wasps, or
    any combination thereof.

11. The central hub of claim 8, further comprising:
    determining a moisture level of the wood item based on the resistance of the wood item.

12. The central hub of claim 8, further comprising:
    receiving, from a second sensor node that is mounted to a second wood item inside a second wall of the building, a second notification that includes second sensor data comprising:
        a second ambient temperature;
        a second ambient humidity;
        a second resistance of the second wood item; and
        second audio data associated with the second wood item;
    performing a second analysis, by the artificial intelligence algorithm executed by the one or more processors, of the second sensor data; and
    determining, by the one or more processors and based on the second analysis, an absence of the pest in the second wood item.

13. The central hub of claim 12, further comprising:
    creating a sensor node map that includes:
        a location of the sensor node in the building; and
        a second location of the second sensor node in the building.

14. One or more non-transitory computer readable media storing instructions executable by one or more processors to perform operations comprising:

receiving, by a central hub and from a sensor node that is mounted to a wood item inside a wall of a building, a notification including sensor data comprising:
  an ambient temperature inside the wall of the building;
  an ambient humidity inside the wall of the building;
  a resistance of the wood item between two metal fasteners used to fasten the sensor node to the wood item; and
  audio data captured by a microphone of the sensor node that is coupled to the wood item;
performing an analysis of the sensor data by an artificial intelligence algorithm;
determining, based on the analysis, a presence of a pest in the wood item; and
sending a message indicating the presence of the pest to a computing device.

15. The one or more non-transitory computer readable media of claim 14, wherein determining the presence of the pest in the wood item comprises:
  determining that the ambient temperature is at least 65 degrees fahrenheit;
  determining, based on the resistance of the wood item, that a moisture content of the wood item is at least 15 percent; and
  determining that the ambient humidity is at least 50 percent.

16. The one or more non-transitory computer readable media of claim 14, the operations further comprising:
  receiving a request message requesting particular information about a particular location in the building from the computing device;
  determining an address of a particular sensor node located in the particular location;
  broadcasting a query message with the address of the particular sensor node;
  receiving a sensor node response from the particular sensor node that includes the particular information; and
  sending a response to the computing device that includes at least the particular information.

17. The one or more non-transitory computer readable media of claim 14, wherein the pest comprises at least one of:
  carpenter ants,
  termites,
  wood-boring beetles,
  carpenter bees,
  wood wasps, or
  any combination thereof.

18. The one or more non-transitory computer readable media of claim 14, wherein the operations further comprise:
  the audio data indicates a presence of termite activity in an ultrasonic frequency range of the audio data.

19. The one or more non-transitory computer readable media of claim 18, wherein:
  the artificial intelligence algorithm comprises a neural network trained to detect at least one type of wood-boring pest.

20. The one or more non-transitory computer readable media of claim 18, wherein:
  the wood item comprises a part of a structure of the building.

* * * * *